(12) United States Patent
Endo et al.

(10) Patent No.: US 8,992,322 B2
(45) Date of Patent: Mar. 31, 2015

(54) INTERACTIVE GAMING SYSTEMS WITH HAPTIC FEEDBACK

(75) Inventors: Shoichi Endo, Cupertino, CA (US); Alexander Jasso, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 1463 days.

(21) Appl. No.: 10/864,108

(22) Filed: Jun. 9, 2004

(65) Prior Publication Data

US 2005/0017454 A1    Jan. 27, 2005

Related U.S. Application Data

(60) Provisional application No. 60/477,214, filed on Jun. 9, 2003.

(51) Int. Cl.
*A63F 9/00* (2006.01)
*G06F 3/01* (2006.01)
*A63F 13/20* (2014.01)

(52) U.S. Cl.
CPC ............... *G06F 3/016* (2013.01); *A63F 13/06* (2013.01); *A63F 2300/1037* (2013.01); *A63F 2300/1062* (2013.01); *A63F 2300/8011* (2013.01); *G06F 2203/013* (2013.01)
USPC .......................................................... 463/37

(58) Field of Classification Search
USPC ....................................................... 463/36–37
See application file for complete search history.

(56) References Cited

U.S. PATENT DOCUMENTS

| 2,524,782 A | 10/1950 | Ferrar et al. |
| 3,157,853 A | 11/1964 | Hirsch |
| 3,220,121 A | 11/1965 | Cutler |
| 3,490,059 A | 1/1970 | Paulsen et al. |

(Continued)

FOREIGN PATENT DOCUMENTS

| DE | 196 36 831 C | 2/1998 |
| EP | 0 085 518 B1 | 8/1989 |

(Continued)

OTHER PUBLICATIONS

Adelstein, "A Virtual Environment System for the Study of Human Arm Tremor," Ph.D. Dissertation, Dept. of Mechanical Engineering, MIT, Jun. 1989.

(Continued)

*Primary Examiner* — Seng H Lim
(74) *Attorney, Agent, or Firm* — Kilpatrick Townsend & Stockton LLP

(57) ABSTRACT

Interactive gaming systems and methods with haptic feedback are described. One described apparatus comprises: a portable manipulandum configured to simulate an element associated with a sports activity; a sensor in communication with the portable manipulandum and configured to detect a movement of the portable manipulandum; an actuator disposed in the portable manipulandum; and a processor in communication with the sensor and the actuator. The processor is configured to receive a sensor signal from the sensor associated with the movement of the portable manipulandum and to output a control signal to the actuator based at least in part on the sensor signal. The control signal is configured to cause the actuator to output a haptic feedback associated with the movement of the portable manipulandum, e.g., simulating an impact between the portable manipulandum and an object.

49 Claims, 6 Drawing Sheets

(56) References Cited

U.S. PATENT DOCUMENTS

| | | |
|---|---|---|
| 3,497,668 A | 2/1970 | Hirsch |
| 3,517,446 A | 6/1970 | Corlyon et al. |
| 3,623,046 A | 11/1971 | Scourtes |
| 3,875,488 A | 4/1975 | Crocker et al. |
| 3,902,687 A | 9/1975 | Hightower |
| 3,903,614 A | 9/1975 | Diamond et al. |
| 4,050,265 A | 9/1977 | Drennen et al. |
| 4,103,155 A | 7/1978 | Clark |
| 4,125,800 A | 11/1978 | Jones |
| 4,148,014 A | 4/1979 | Burson |
| 4,160,508 A | 7/1979 | Salsbury |
| 4,236,325 A | 12/1980 | Hall et al. |
| 4,311,980 A | 1/1982 | Prusenziati |
| 4,385,836 A | 5/1983 | Schmitt |
| 4,391,282 A | 7/1983 | Ando et al. |
| 4,400,790 A | 8/1983 | Chambers et al. |
| 4,443,952 A | 4/1984 | Schulien et al. |
| 4,513,235 A | 4/1985 | Acklam et al. |
| 4,546,347 A | 10/1985 | Kirsch |
| 4,581,491 A | 4/1986 | Boothroyd |
| 4,599,070 A | 7/1986 | Hladky et al. |
| 4,637,264 A | 1/1987 | Takahashi et al. |
| 4,639,884 A | 1/1987 | Sagues |
| 4,678,908 A | 7/1987 | LaPlante |
| 4,680,466 A | 7/1987 | Kuwahara et al. |
| 4,692,726 A | 9/1987 | Green et al. |
| 4,695,266 A | 9/1987 | Hui |
| 4,699,043 A | 10/1987 | Violante De Dionigi |
| 4,708,656 A | 11/1987 | De Vries et al. |
| 4,712,101 A | 12/1987 | Culver |
| 4,713,007 A | 12/1987 | Alban |
| 4,724,715 A | 2/1988 | Culver |
| 4,728,954 A | 3/1988 | Phelan et al. |
| 4,734,685 A | 3/1988 | Watanabe |
| 4,776,701 A | 10/1988 | Pettigrew |
| 4,794,384 A | 12/1988 | Jackson |
| 4,795,901 A | 1/1989 | Kitazawa |
| 4,799,055 A | 1/1989 | Nestler et al. |
| 4,803,413 A | 2/1989 | Kendig et al. |
| 4,811,608 A | 3/1989 | Hilton |
| 4,815,006 A | 3/1989 | Andersson et al. |
| 4,819,195 A | 4/1989 | Bell et al. |
| 4,823,106 A | 4/1989 | Lovell |
| 4,825,157 A | 4/1989 | Mikan |
| 4,840,634 A | 6/1989 | Muller et al. |
| 4,851,771 A | 7/1989 | Ikeda et al. |
| 4,860,051 A | 8/1989 | Taniguchi et al. |
| 4,891,764 A | 1/1990 | McIntosh |
| 4,891,889 A | 1/1990 | Tomelleri |
| 4,906,843 A | 3/1990 | Jones et al. |
| 4,914,976 A | 4/1990 | Wyllie |
| 4,930,770 A | 6/1990 | Baker |
| 4,934,694 A | 6/1990 | McIntosh |
| 4,935,725 A | 6/1990 | Turnau |
| 4,935,728 A | 6/1990 | Kley |
| 4,937,685 A | 6/1990 | Barker et al. |
| 4,940,234 A | 7/1990 | Ishida et al. |
| 4,962,448 A | 10/1990 | DeMaio et al. |
| 4,964,837 A | 10/1990 | Collier |
| 4,965,446 A | 10/1990 | Vyse |
| 4,982,504 A | 1/1991 | Soderberg et al. |
| 4,988,981 A | 1/1991 | Zimmerman et al. |
| 5,006,703 A | 4/1991 | Shikunami et al. |
| 5,019,761 A | 5/1991 | Kraft |
| 5,022,407 A | 6/1991 | Horch et al. |
| 5,024,626 A | 6/1991 | Robbins et al. |
| 5,035,242 A | 7/1991 | Franklin |
| 5,038,089 A | 8/1991 | Szakaly |
| 5,053,975 A | 10/1991 | Tsuchihashi et al. |
| 5,062,830 A | 11/1991 | Dunlap |
| 5,065,145 A | 11/1991 | Purcell |
| 5,068,529 A | 11/1991 | Ohno et al. |
| 5,078,152 A | 1/1992 | Bond |
| 5,079,845 A | 1/1992 | Childers |
| 5,086,197 A | 2/1992 | Liou |
| 5,095,303 A | 3/1992 | Clark et al. |
| 5,107,080 A | 4/1992 | Rosen |
| 5,113,179 A | 5/1992 | Scott-Jackson et al. |
| 5,116,051 A | 5/1992 | Moncrief et al. |
| 5,125,261 A | 6/1992 | Powley |
| 5,132,927 A | 7/1992 | Lenoski et al. |
| 5,138,154 A | 8/1992 | Hotelling |
| 5,139,261 A | 8/1992 | Openiano |
| 5,148,377 A | 9/1992 | McDonald |
| 5,155,423 A | 10/1992 | Karlen et al. |
| 5,168,268 A | 12/1992 | Levy |
| 5,182,557 A | 1/1993 | Lang |
| 5,186,629 A | 2/1993 | Rohen |
| 5,186,695 A | 2/1993 | Mangseth et al. |
| 5,195,179 A | 3/1993 | Tokunaga |
| 5,195,920 A | 3/1993 | Collier |
| 5,202,961 A | 4/1993 | Mills et al. |
| 5,204,600 A | 4/1993 | Kahkoska |
| 5,209,131 A | 5/1993 | Baxter |
| 5,212,473 A | 5/1993 | Louis |
| 5,216,337 A | 6/1993 | Orton et al. |
| 5,223,658 A | 6/1993 | Suzuki |
| 5,229,836 A | 7/1993 | Nagano |
| 5,230,623 A | 7/1993 | Guthrie et al. |
| 5,235,868 A | 8/1993 | Culver |
| 5,239,249 A | 8/1993 | Ono |
| 5,240,417 A | 8/1993 | Smithson et al. |
| 5,246,316 A | 9/1993 | Smith |
| 5,247,648 A | 9/1993 | Watkins et al. |
| 5,254,919 A | 10/1993 | Bridges et al. |
| 5,271,290 A | 12/1993 | Fischer |
| 5,275,174 A | 1/1994 | Cook |
| 5,275,565 A | 1/1994 | Moncrief |
| 5,280,276 A | 1/1994 | Kwok |
| 5,284,330 A | 2/1994 | Carlson et al. |
| 5,289,273 A | 2/1994 | Lang |
| 5,296,846 A | 3/1994 | Ledley |
| 5,299,810 A | 4/1994 | Pierce et al. |
| 5,309,140 A | 5/1994 | Everett |
| 5,313,229 A | 5/1994 | Gilligan et al. |
| 5,313,230 A | 5/1994 | Venolia et al. |
| 5,317,336 A | 5/1994 | Hall |
| 5,329,289 A | 7/1994 | Sakamoto et al. |
| 5,332,225 A * | 7/1994 | Ura .................................. 473/223 |
| 5,334,027 A | 8/1994 | Wherlock |
| 5,341,459 A | 8/1994 | Backes |
| 5,347,306 A | 9/1994 | Nitta |
| 5,351,692 A | 10/1994 | Dow et al. |
| 5,359,193 A | 10/1994 | Nyui et al. |
| 5,368,484 A | 11/1994 | Copperman et al. |
| 5,374,942 A | 12/1994 | Gilligan et al. |
| 5,379,663 A | 1/1995 | Hara |
| 5,384,460 A | 1/1995 | Tseng |
| 5,388,059 A * | 2/1995 | DeMenthon .................. 702/153 |
| 5,389,865 A | 2/1995 | Jacobus et al. |
| 5,390,128 A | 2/1995 | Ryan et al. |
| 5,390,296 A | 2/1995 | Crandall et al. |
| 5,396,266 A | 3/1995 | Brimhall |
| 5,396,267 A | 3/1995 | Bouton |
| 5,397,323 A | 3/1995 | Taylor et al. |
| 5,398,044 A | 3/1995 | Hill |
| 5,402,499 A | 3/1995 | Robison et al. |
| 5,402,582 A | 4/1995 | Raab |
| 5,402,680 A | 4/1995 | Korenaga |
| 5,405,152 A | 4/1995 | Katanics et al. |
| 5,417,696 A | 5/1995 | Kashuba et al. |
| 5,428,748 A | 6/1995 | Davidson et al. |
| 5,436,542 A | 7/1995 | Petelin et al. |
| 5,436,640 A | 7/1995 | Reeves |
| 5,452,615 A | 9/1995 | Hilton |
| 5,453,758 A * | 9/1995 | Sato .............................. 345/158 |
| 5,457,479 A | 10/1995 | Cheng |
| 5,457,793 A | 10/1995 | Elko et al. |
| 5,459,382 A | 10/1995 | Jacobus et al. |
| 5,466,213 A | 11/1995 | Hogan |
| 5,467,763 A | 11/1995 | McMahon et al. |
| 5,473,344 A | 12/1995 | Bacon et al. |
| 5,474,082 A | 12/1995 | Junker |
| 5,481,914 A | 1/1996 | Ward |

(56) References Cited

U.S. PATENT DOCUMENTS

| | | |
|---|---|---|
| 5,491,477 A | 2/1996 | Clark et al. |
| 5,512,919 A | 4/1996 | Araki |
| 5,514,150 A | 5/1996 | Rostoker |
| 5,519,618 A | 5/1996 | Kastner et al. |
| 5,524,195 A | 6/1996 | Clanton, III et al. |
| 5,526,022 A | 6/1996 | Donahue et al. |
| 5,530,455 A | 6/1996 | Gillick et al. |
| 5,542,672 A | 8/1996 | Meredith |
| 5,543,821 A | 8/1996 | Marchis et al. |
| 5,547,382 A | 8/1996 | Yamasaki |
| 5,547,383 A | 8/1996 | Yamaguchi |
| 5,550,562 A | 8/1996 | Aoki et al. |
| 5,550,563 A | 8/1996 | Matheny et al. |
| 5,565,840 A | 10/1996 | Thorner et al. |
| 5,570,111 A | 10/1996 | Barrett et al. |
| 5,576,727 A | 11/1996 | Rosenberg et al. |
| 5,583,407 A | 12/1996 | Yamaguchi |
| 5,589,828 A | 12/1996 | Armstrong |
| 5,591,924 A | 1/1997 | Hilton |
| 5,592,401 A | 1/1997 | kramer |
| 5,604,345 A | 2/1997 | Matsuura |
| 5,611,731 A | 3/1997 | Bouton et al. |
| 5,616,078 A | 4/1997 | Oh |
| 5,623,582 A | 4/1997 | Rosenberg |
| 5,623,642 A | 4/1997 | Katz et al. |
| 5,627,531 A | 5/1997 | Posso et al. |
| 5,628,686 A | 5/1997 | Svancarek et al. |
| 5,635,897 A | 6/1997 | Kuo |
| 5,638,421 A | 6/1997 | Serrano et al. |
| 5,652,603 A | 7/1997 | Abrams |
| 5,666,138 A | 9/1997 | Culver |
| 5,680,141 A | 10/1997 | Didomenico et al. |
| 5,691,747 A | 11/1997 | Amano |
| 5,691,898 A * | 11/1997 | Rosenberg et al. ............ 700/85 |
| 5,692,117 A | 11/1997 | Berend et al. |
| 5,694,153 A | 12/1997 | Aoyagi et al. |
| 5,701,140 A | 12/1997 | Rosenberg et al. |
| 5,704,837 A | 1/1998 | Iwasaki et al. |
| 5,713,792 A | 2/1998 | Ohzono |
| 5,722,071 A | 2/1998 | Berg et al. |
| 5,724,106 A | 3/1998 | Autry et al. |
| 5,724,264 A | 3/1998 | Rosenberg et al. |
| 5,734,108 A | 3/1998 | Walker et al. |
| 5,734,373 A | 3/1998 | Rosenberg et al. |
| 5,739,811 A * | 4/1998 | Rosenberg et al. ............ 345/161 |
| 5,740,083 A | 4/1998 | Anderson et al. |
| 5,741,182 A * | 4/1998 | Lipps et al. .................... 463/36 |
| 5,742,278 A | 4/1998 | Chen et al. |
| 5,745,057 A | 4/1998 | Sasaki et al. |
| 5,749,577 A | 5/1998 | Couch et al. |
| 5,751,273 A * | 5/1998 | Cohen ............................. 345/156 |
| 5,755,620 A | 5/1998 | Yamamoto et al. |
| 5,763,874 A | 6/1998 | Luciano et al. |
| 5,766,016 A | 6/1998 | Sinclair |
| 5,767,836 A | 6/1998 | Scheffer et al. |
| 5,771,037 A | 6/1998 | Jackson |
| 5,785,630 A | 7/1998 | Bobick et al. |
| 5,795,228 A | 8/1998 | Trumbull et al. |
| 5,805,140 A | 9/1998 | Roseberg et al. |
| 5,808,568 A | 9/1998 | Wu |
| 5,808,603 A | 9/1998 | Chen |
| 5,818,426 A | 10/1998 | Tierney et al. |
| 5,825,305 A | 10/1998 | Biferno |
| 5,828,295 A | 10/1998 | Mittel et al. |
| 5,831,593 A | 11/1998 | Rutledge |
| 5,841,133 A | 11/1998 | Omi |
| 5,841,423 A | 11/1998 | Carroll, Jr. et al. |
| 5,841,428 A | 11/1998 | Jaeger et al. |
| 5,844,673 A | 12/1998 | Ivers |
| 5,877,748 A | 3/1999 | Redlich |
| 5,879,327 A | 3/1999 | Moreau DeFarges et al. |
| 5,889,506 A | 3/1999 | Lopresti et al. |
| 5,889,670 A | 3/1999 | Schuler et al. |
| 5,912,661 A | 6/1999 | Siddiqui |
| 5,913,727 A | 6/1999 | Ahdoot |
| 5,917,486 A | 6/1999 | Rylander |
| 5,919,159 A | 7/1999 | Lilley et al. |
| 5,936,613 A | 8/1999 | Jaeger et al. |
| 5,954,689 A | 9/1999 | Poulsen |
| 5,959,613 A | 9/1999 | Rosenberg et al. |
| 5,963,196 A | 10/1999 | Nishiumi et al. |
| 5,986,638 A | 11/1999 | Cheng |
| 5,999,185 A | 12/1999 | Kato et al. |
| 6,001,014 A * | 12/1999 | Ogata et al. ..................... 463/37 |
| 6,004,134 A | 12/1999 | Marcus et al. |
| 6,017,273 A | 1/2000 | Pelkey |
| 6,028,593 A | 2/2000 | Rosenberg et al. |
| 6,031,222 A | 2/2000 | Carapelli |
| 6,078,311 A | 6/2000 | Pelkey |
| 6,078,876 A | 6/2000 | Rosenberg et al. |
| 6,097,499 A | 8/2000 | Casey et al. |
| 6,097,964 A | 8/2000 | Nuovo et al. |
| 6,100,874 A | 8/2000 | Schena et al. |
| 6,104,379 A | 8/2000 | Petrich et al. |
| 6,111,577 A | 8/2000 | Zilles et al. |
| 6,162,123 A * | 12/2000 | Woolston ......................... 463/37 |
| 6,183,364 B1 | 2/2001 | Trovato |
| 6,192,432 B1 | 2/2001 | Slivka et al. |
| 6,219,034 B1 | 4/2001 | Elbing et al. |
| 6,241,574 B1 | 6/2001 | Helbing |
| 6,259,433 B1 | 7/2001 | Meyers |
| 6,280,327 B1 | 8/2001 | Leifer et al. |
| 6,285,351 B1 | 9/2001 | Chang et al. |
| 6,293,798 B1 | 9/2001 | Boyle et al. |
| 6,295,608 B1 | 9/2001 | Parkes et al. |
| 6,300,038 B1 | 10/2001 | Shimazu et al. |
| 6,300,937 B1 | 10/2001 | Rosenberg |
| 6,342,880 B2 * | 1/2002 | Rosenberg et al. ............ 345/161 |
| 6,349,301 B1 | 2/2002 | Mitchell et al. |
| 6,366,272 B1 | 4/2002 | Rosenberg et al. |
| 6,411,276 B1 | 6/2002 | Braun et al. |
| 6,416,327 B1 | 7/2002 | Wittenbecher |
| 6,418,329 B1 | 7/2002 | Furuya |
| 6,422,941 B1 * | 7/2002 | Thorner et al. .................. 463/30 |
| 6,546,390 B1 | 4/2003 | Pollack et al. |
| 6,589,117 B1 | 7/2003 | Moritome et al. |
| 6,633,224 B1 | 10/2003 | Hishida et al. |
| 6,693,622 B1 * | 2/2004 | Shahoian et al. .............. 345/156 |
| 6,722,888 B1 | 4/2004 | Macri et al. |
| 6,760,751 B1 | 7/2004 | Hachiya et al. |
| 6,767,282 B2 * | 7/2004 | Matsuyama et al. .............. 463/3 |
| 6,902,482 B1 * | 6/2005 | Woolston ......................... 463/37 |
| 6,967,566 B2 * | 11/2005 | Weston et al. ............. 340/323 R |
| 7,001,272 B2 * | 2/2006 | Yamashita et al. ................. 463/7 |
| 7,247,097 B2 * | 7/2007 | Woolston ......................... 463/37 |
| 7,445,550 B2 * | 11/2008 | Barney et al. ................... 463/37 |
| 2001/0018354 A1 | 8/2001 | Pigni |
| 2001/0026266 A1 | 10/2001 | Schena et al. |
| 2001/0045978 A1 | 11/2001 | McConnell et al. |
| 2002/0072674 A1 | 6/2002 | Criton et al. |
| 2003/0043206 A1 | 3/2003 | Duarte |
| 2003/0112269 A1 | 6/2003 | Lentz et al. |
| 2004/0076444 A1 | 4/2004 | Badovinac et al. |
| 2004/0193393 A1 | 9/2004 | Keane |
| 2005/0187747 A1 | 8/2005 | Paxson et al. |
| 2006/0030383 A1 | 2/2006 | Rosenberg et al. |

FOREIGN PATENT DOCUMENTS

| | | |
|---|---|---|
| EP | 0349086 | 1/1990 |
| EP | 0 470 257 A1 | 2/1992 |
| EP | 0 358 989 B1 | 7/1994 |
| EP | 0 875 819 B1 | 10/2002 |
| GB | 2 237 160 A | 4/1991 |
| GB | 2 347 199 A | 8/2000 |
| JP | 01-003664 | 7/1990 |
| JP | 02-109714 | 1/1992 |
| JP | 04-007371 | 8/1993 |
| JP | 05-193862 | 1/1995 |
| WO | WO 96/16397 | 5/1996 |
| WO | WO 96/24398 | 8/1996 |
| WO | WO 96/32679 | 10/1996 |
| WO | WO 00/77689 A1 | 12/2000 |

(56) References Cited

FOREIGN PATENT DOCUMENTS

| WO | WO 01/00630 A1 | 1/2001 |
|---|---|---|
| WO | WO 01/67297 A1 | 9/2001 |
| WO | WO 03/000319 A1 | 1/2003 |

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.
Aukstakalnis et al., "Silicon Mirage: The Art and Science of Virtual Reality," ISBN 0-938151-82-7, pp. 129-180, 1992.
Baigrie, "Electric Control Loading—A Low Cost, High Performance Alternative," Proceedings, pp. 247-254, Nov. 6-8, 1990.
Bejczy et al., "Kinesthetic Coupling Between Operator and Remote Manipulator," International Computer Technology Conference, The American Society of Mechanical Engineers, San Francisco, CA, Aug. 12-15, 1980.
Bejczy, "Sensors, Controls, and Man-Machine Interface for Advanced Teleoperation," Science, vol. 208, No. 4450, pp. 1327-1335, 1980.
Bejczy, "Generalization of Bilateral Force-Reflecting Control of Manipulators," Proceedings of Fourth CISM-IFToMM, Sep. 8-12, 1981.
Bejczy, et al., "Universal Computer Control System (UCCS) for Space Telerobots," CH2413-3/87/0000/0318501.00 1987 IEEE, 1987.
Bejczy et al., "A Laboratory Breadboard System for Dual-Arm Teleoperation," SOAR '89 Workshop, JSC, Houston, TX, Jul. 25-27, 1989.
Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.
Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.
Caldwell et al., "Enhanced Tactile Feedback (Tele-Taction) Using a Multi-Functional Sensory System," 1050-4729/93, pp. 955-960, 1993.
"Cyberman Technical Specification," Logitech Cyberman Swift Supplement, Apr. 5, 1994.
Eberhardt et al., "OMAR—A Haptic display for speech perception by deaf and deaf-blind individuals," IEEE Virtual Reality Annual International Symposium, Seattle, WA, Sep. 18-22, 1993.
Eberhardt et al., "Including Dynamic Haptic Perception by The Hand: System Description and Some Results," DSC-vol. 55-1, Dynamic Systems and Control: vol. 1, ASME 1994.
Gobel et al., "Tactile Feedback Applied to Computer Mice," International Journal of Human-Computer Interaction, vol. 7, No. 1, pp. 1-24, 1995.
Gotow et al., "Controlled Impedance Test Apparatus for Studying Human Interpretation of Kinesthetic Feedback," WA11-11:00, pp. 332-337.
Howe, "A Force-Reflecting Teleoperated Hand System for the Study of Tactile Sensing in Precision Manipulation," Proceedings of the 1992 IEEE International Conference on Robotics and Automation, Nice, France, May 1992.
IBM Technical Disclosure Bulletin, "Mouse Ball-Actuating Device With Force and Tactile Feedback," vol. 32, No. 9B, Feb. 1990.
Iwata, "Pen-based Haptic Virtual Environment," 0-7803-1363-1/93 IEEE, pp. 287-292, 1993.
Jacobsen et al., "High Performance, Dextrous Telerobotic Manipulator With Force Reflection," Intervention/ROV '91 Conference & Exposition, Hollywood, Florida, May 21-23, 1991.
Jones et al., "A perceptual analysis of stiffness," ISSN 0014-4819 Springer International (Springer-Verlag); Experimental Brain Research, vol. 79, No. 1, pp. 150-156, 1990.
Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.
Marcus, "Touch Feedback in Surgery," Proceedings of Virtual Reality and Medicine the Cutting Edge, Sep. 8-11, 1994.
McAffee, "Teleoperator Subsystem/Telerobot Demonstrator: Force Reflecting Hand Controller Equipment Manual," JPL D-5172, pp. 1.50, A1-A36, B1-B5, C1-C36, Jan. 1988.
Minsky, "Computational Haptics: The Sandpaper System for Synthesizing Texture for a Force-Feedback Display," Ph.D. Dissertation, MIT, Jun. 1995.
Ouh-Young, "Force Display in Molecular Docking," Order No. 9034744, p. 1-369, 1990.
Ouh-Young, "A Low-Cost Force Feedback Joystick and Its Use in PC Video Games," IEEE Transactions on Consumer Electronics, vol. 41, No. 3, Aug. 1995.
Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.
Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.
Pimentel et al., "Virtual Reality: through the new looking glass," $2^{nd}$ Edition; McGraw-Hill, ISBN 0-07-050167-X, pp. 41-202, 1994.
Rabinowitz et al., "Multidimensional tactile displays: Identification of vibratory intensity, frequency, and contactor area," Journal of the Acoustical Society of America, vol. 82, No. 4, Oct. 1987.
Russo, "The Design and Implementation of a Three Degree of Freedom Force Output Joystick," MIT Libraries Archives Aug. 14, 1990, pp. 1-131, May 1990.
Russo, "Controlling Dissipative Magnetic Particle Brakes in Force Reflective Devices," DSC-vol. 42, Advances in Robotics, pp. 63-70, ASME 1992.
Scannell, "Taking a Joystick Ride," Computer Currents, Boston Edition, vol. 9, No. 11, Nov. 1994.
Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.
Snow et al., "Model-X Force-Reflecting-Hand-Controller," NT Control No. MPO-17851; JPL Case No. 5348, pp. 1-4, Jun. 15, 1989.
Stanley et al., "Computer Simulation of Interacting Dynamic Mechanical Systems Using Distributed Memory Parallel Processors," DSC-vol. 42, Advances in Robotics, pp. 55-61, ASME 1992.
Tadros, "Control System Design for a Three Degree of Freedom Virtual Environment Simulator Using Motor/Brake Pair Actuators", MIT Archive @ Massachusetts Institute of Technology, pp. 1-88, Feb. 1990.
Terry et al., "Tactile Feedback in a Computer Mouse," Proceedings of Fourteenth Annual Northeast Bioengineering Conference, University of New Hampshire, Mar. 10-11, 1988.
Adelstein, B., A Virtual Environment System for the Study of Human Arm Tremor, Submitted to the Dept. of Mechanical Engineering in partial fulfillment of the requirements for the degree of Doctor of Philosophy at the Massachusetts Institute of Technology, Jun. 1989, pp. 1-253.
Adelstein, B. et al., Design and Implementation of a Force Reflecting Manipulandum for Manual Control Research, DSC-vol. 42, Advances in Robotics, ASME 1992, pp. 1-12.
Akamatsu et al., Multimodal Mouse: A Mouse-Type Device with Tactile and Force Display, Presence, vol. 3, No. 1 pp. 73-80, 1994.
ATIP98.059: Virtual Reality (VR) Development at SERI (Korea), Asian Technology Information Program (ATIP) Jul. 20, 1998, pp. 1-9.
Aukstakalnis, S. et al., The Art and Science of Virtual Reality Silicon Mirage, 1992, Peachpit Press, Inc., Berkeley, CA, pp. 129-180.
Baigrie, S. et al., Electric Control Loading-A Low Cost, High Performance Alternative, Proceedings, Nov. 6-8, 1990, pp. 247-254.

(56) References Cited

OTHER PUBLICATIONS

Bejczy, A., Sensors, Controls, and Man-Machine Interface for Advanced Teleoperation, Science, vol. 208, No. 4450, 1980, pp. 1327-1335.

Bejczy, A. et al., Kinesthetic Coupling Between Operator and Remote Manipulator, International Computer Technology Conference, The American Society of Mechanical Engineers, San Francisco, CA, Aug. 12-15, 1980, pp. 1-9.

Bejczy, A. et al., A Laboratory Breadboard System for Dual-Arm Teleoperation, SOAR '89 Workshop, JSC, Houston, Jul. 25-27, 1989.

Bejczy, A. et al., Universal Computer Control System (UCCS) for Space Telerobots, Jet Propulsion Laboratory, California Institute of Technology, Pasadena, CA, pp. 317-324.

Bjork, S. et al., An Alternative to Scroll Bars on Small Screens, Play: Applied Research on Art and Technology, Viktoria Institute, Box 620, SE-405 30 Gothenburg, Sweden, pp. 1-2.

Bouguila, L. et al., Effect of Coupling Haptics and Stereopsis on Depth Perception in Virtual Environment, Precision and Intelligence Laboratory, Tokyo Institute of Technology, 4259 Nagatsuta cho Midori ku Yokohama shi 226-8503-Japan.

Brooks, T. et al., Hand Controllers for Teleoperation: A State-of-the-Art Technology Survey and Evaluation, 1985, NASA Jet Propulsion Laboratory, California Institute of Technology, Pasadena, CA.

Burdea, G. et al., Distributed Virtual Force Feedback, IEEE Workshop on "Force Display in Virtual Environments and its Application to Robotic Teleoperation," May 2, 1993, Atlanta, GA.

Calder, B. et al., Design of a Force-Feedback Touch-Inducing Actuator for Teleoperator Robot Control, Submitted to the Department of Mechanical Engineering and Electrical Engineering in partial Fulfillment of the requirements of the degree of Bachelors of Science in Mechanical Engineering and Bachelor of Science in Electrical Engineering at the Massachusetts Institute of Technology, May 1983.

Caldwell, D. et al., Enhanced Tactile Feedback (Tele-Taction) using a Multi-Functional Sensory System, Dept. of Electronic Eng., University of Salford, Salford, M5 4WT, UK, 1993.

Cyberman Technical Specification, Logitech Cyberman Swift Supplement, Revision 1.0, Apr. 5, 1994, pp. 1-29.

Eberhardt, S. et al., Omar-A Haptic Display for Speech Perception by Deaf and Deaf-Blind Individuals, IEEE Virtual Reality Annual International Symposium, Sep. 18-22, 1993, Seattle Washington.

Eberhardt, S. et al., Inducing Dynamic Haptic Perception by the Hand: System Description and Some Results, Dynamic Systems and Control, 1994, vol. 1, presented at 1994 International Mechanical Engineering Congress and Exposition, Chicago Illinois, Nov. 6-11, 1994.

Fukumoto, M. et al., Active Click: Tactile Feedback for Touch Panels, NTT DoCoMo Multimedia Labs, Japan.

Gobel, M. et al., Tactile Feedback Applied to Computer Mice, International Journal of Human-Computer Interaction, vol. 7, No. 1, pp. 1-24, 1995.

Gotow, J. et al., Controlled Impedance Test Apparatus for Studying Human Interpretation of Kinesthetic Feedback, The Robotics Institute and Deptartmetn of Mechanical Engineering, Carnegie Mellon University, Pittsburgh, PA 15213, pp. 332-337.

Hansen, W., Enhancing Docuemtns with Embedded Programs: How Ness extends Insets in the Andrew Toolkit, 1990, Information Technology Center, Carnegie Mellon University, Pittsburgh, PA 15213.

Hasser, C. et al., Tactile Feedback with Adaptive Controller for a Force-Reflecting Haptic Display Part 1: Design, 1996, Armstrong Laboratory, Human Systems Center, Air Force Materiel Command, Wright-Patterson AFB OH 45433.

Hasser, C. et al., Tactile Feedback for a Force-Reflecting Haptic Display, Thesis Submitted to the School of Engineering of the University of Daytona, Dayton OH, Dec. 1995.

Hasser, C., Force-Reflecting Anthropomorphic Hand Masters, Crew Systems Directorate Biodynamics and Biocommunications Division, Wright-Patterson AFB OH 45433-7901, Jul. 1995, Interim Report for the Period Jun. 1991-Jul. 1995.

Hinckley, K. et al., Haptic Issues for Virtual Manipulation, A Dissertation presented to the Faculty of the School of Engineering and Applied Science at the University of Virginia, in Partial Fulfillment of the Requirement for the Degree Doctor of Philosophy (Computer Science), Dec. 1996.

Howe, R., A Force-Reflecting Teleoperated Hand System for the Study of Tactile Sensing in Precision Manipulation, Proceedings of the 1992 IEEE Conference in Robotics and Automation, Nice, France-May 1992.

Iwata, H., Pen-Based Haptic Virtual Environment, Institute of Engineering Mechanics, University of Tsukuba, Japan, 1993.

Jacobsen, S. et al., High Performance, Dextrous Telerobotic Manipulator with Force Reflection, Intervention/ROV '91, Conference & Exposition, May 21-23, 1991, Hollywood, FL.

Johnson, A., Shape-Memory Alloy Tactical Feedback Actuator, Phase I-Final Report, Air Force SABIR Contract F33-88-C-0541, Armstrong Aerospace Medical Research Laboratory, Human Systems Division, Air Force Systems Command, Wright-Patterson Air Force Base, OH 45433.

Jones, L. et al., A Perceptual Analysis of Stiffness, Experimental Brain Research, 1990, vol. 79, pp. 150-156.

Kaczmarek, K. et al., Tactile Displays, Virtual Environment Technologies, pp. 349-414.

Kelley, A. et al., MagicMouse: Tactile and Kinesthetic Feedback in the Human-Computer Interface using an Electromagnetically Actuated Input/Output Device, Department of Electrical Engineering, University of British Columbia, Canada, Oct. 19, 1993.

Lake, S.L., Cyberman from Logitech, web site at http://www.ibiblio.org/GameBytes/issues21/greviews/cyberman/html, as available via the Internet and printed May 29, 2002.

Maclean K., Designing with Haptic Feedback, Interval Research Corporation, 1801 Page Mill Road, Palo Alto, CA 94304, 2000.

Mine, M., Isaac: A Virtual Environment Tool for the Interactive Construction of Virtual Worlds, Department of Computer Science, University of North Carolina Chapel Hill, 1995.

Picinbono, G. et al., Extrapolation: A Solution for Force Feedback, Virtual Reality and Prototyping, Jun. 1999, Laval, France.

Wloka, M., Interacting with Virtual Reality, Science and Technology Center for Computer Graphics and Scientific Visualization, Brown University Site, Department of Computer Science, 1995.

eRENA, Pushing Mixed Reality Boundaries, Deliverable 7b.1, Final, Version 1.0.

Real Time Graphics, The Newsletter of Virtual Environment Technologies and Markets, Aug. 1998, vol. 7, No. 2.

1998 IEEE International Conference on Robotics and Automation, May 16-20, 1998, Lueven, Belgium.

PCT Search Report corresponding to PCT/US04/18412 mailed on Nov. 3, 2004.

United States Patent and Trademark Office, Office Action, U.S. Appl. No. 11/233,563, dated Mar. 4, 2010.

United States Patent and Trademark Office, Office Action, U.S. Appl. No. 11/233,563, dated Aug. 6, 2008.

United States Patent and Trademark Office, Office Action, U.S. Appl. No. 11/233,563, dated Aug. 14, 2009.

United States Patent and Trademark Office, Office Action, U.S. Appl. No. 09/934,739, dated May 16, 2006.

United States Patent and Trademark Office, Office Action, U.S. Appl. No. 09/934,739, dated Dec. 13, 2005.

United States Patent and Trademark Office, Office Action, U.S. Appl. No. 09/934,739, dated Sep. 11, 2002.

* cited by examiner

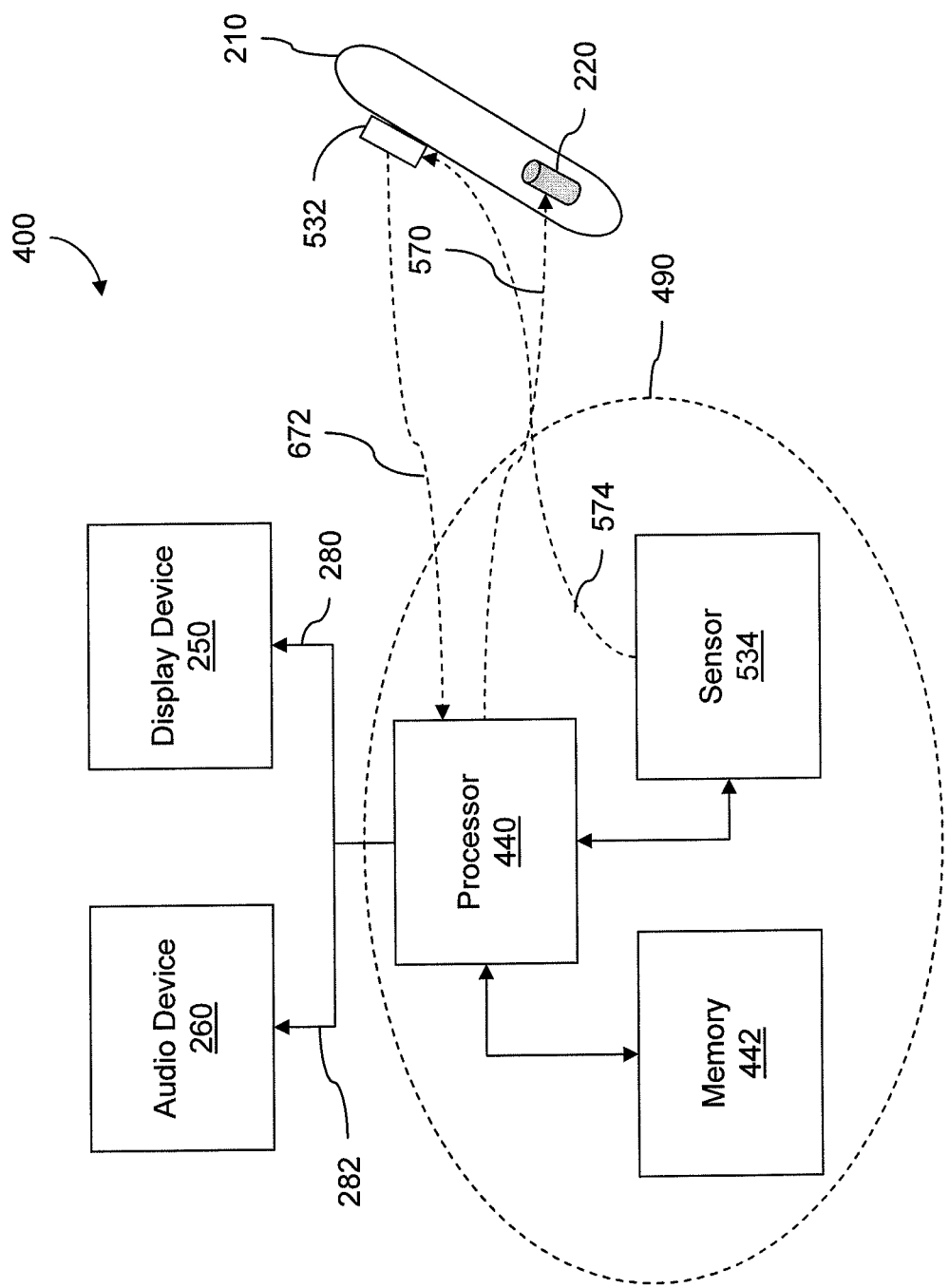

INTERACTIVE GAMING SYSTEMS WITH HAPTIC FEEDBACK

CROSS-REFERENCE TO RELATED APPLICATIONS

This application claims priority to U.S. Provisional Patent Application No. 60/477,214, filed on Jun. 9, 2003, the entire disclosure of which is incorporated herein by reference.

FIELD OF THE INVENTION

This invention relates generally to haptic-feedback systems. More specifically, embodiments of the invention relate to interactive gaming systems with haptic feedback.

BACKGROUND

Interactive gaming systems can simulate various sports or physical activities, such as tennis, baseball, ping-pong, soccer, fishing, or playing a musical instrument. Such systems allow users (or players) to compete with "virtual opponents," or simulate other sports/physical activities (e.g., fishing), in virtual playing fields displayed on televisions, and have gained popularity as entertainment and/or training means. Although visual and audio cues are typically employed to inform the status of the contests, many such systems provide no haptic feedback—an essential component of many sports/physical activities—to the players. A need therefore exists in the art to incorporate haptic feedback in interactive gaming systems, so as to convey greater realism to the players.

SUMMARY

Embodiments of the invention relate to interactive gaming systems and methods with haptic feedback.

In one embodiment, an apparatus comprises: a portable manipulandum configured to simulate an element associated with a physical activity; a sensor in communication with the portable manipulandum and configured to detect a movement of the portable manipulandum; an actuator disposed in the portable manipulandum; and a processor in communication with the sensor and the actuator. The processor is configured to receive a sensor signal from the sensor associated with the movement of the portable manipulandum and to output a control signal to the actuator based at least in part on the sensor signal. The control signal is configured to cause the actuator to output a haptic feedback associated with the movement of the portable manipulandum, e.g., simulating an impact between the portable manipulandum and an object.

These embodiments are mentioned not to limit or define the invention, but to provide examples of embodiments of the invention to aid understanding thereof. Embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein:

FIGS. 5-6 show schematic diagrams of two embodiments of an interactive gaming system with haptic feedback, comprising a two-body sensing system, according to the present invention.

DETAILED DESCRIPTION

Embodiments of this invention provide interactive gaming systems and methods with haptic feedback. It will be appreciated that the term "physical activity" is herein construed broadly to include a sports activity, a music-instrument-playing activity, or any other physical activity that involves operating/maneuvering a manipulandum (or device) and feeling an impact or contact between the manipulandum and an object, as the following embodiments further illustrate. The term "gaming" is herein construed to include simulating such physical activity.

In one embodiment of the invention, an interactive gaming apparatus comprises: a portable manipulandum configured to simulate an element associated with a physical activity; a sensor in communication with the portable manipulandum and configured to detect a movement of the portable manipulandum; an actuator disposed in the portable manipulandum; and a processor in communication with the sensor and the actuator. The processor is configured to receive a sensor signal from the sensor associated with the movement of the portable manipulandum and to output a control signal to the actuator based at least in part on the sensor signal. The control signal is configured to cause the actuator to output a haptic feedback associated with the movement of the portable manipulandum, e.g., simulating an impact between the portable manipulandum and an object.

Figure 1:
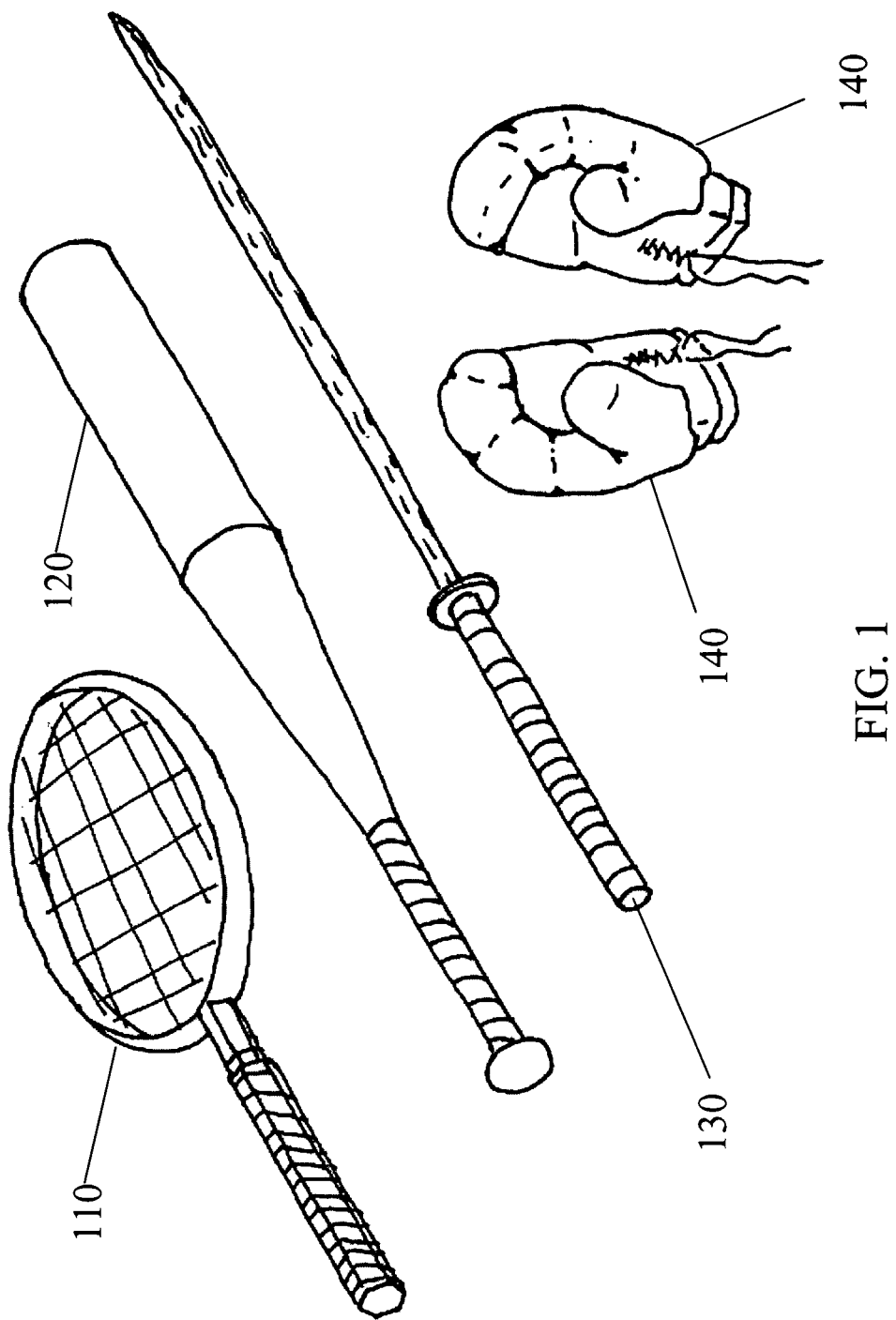
FIG. 1 illustrates several embodiments of a portable manipulandum configured to simulate several sports elements, according to the present invention.

The portable manipulandum is configured to take on or imitate (i.e., simulate) the appearance and/or form of an element associated with a sports or physical activity, such as a racket for tennis, a bat for baseball, etc. By way of example, FIG. 1 depicts several embodiments of a portable manipulandum, each configured to simulate a sports element, including for example a tennis racket 110, a baseball bat 120, a sword 130, and a pair of boxing gloves 140, etc. The manipulandum is also configured to be portable such that it can be hand-held and operated in a stand-alone or un-tethered fashion. The ensuing description provides more examples of such manipulandum.

In one embodiment, the portable manipulandum may be used for example by a player (not explicitly shown) as a tennis racket to practice playing tennis. The sensor can be for example a motion sensor such as an acceleration sensor (or accelerometer) or tilt sensor, e.g., disposed in and forming an integrated structure with the portable manipulandum in a manner that allows it to effectively track the motion of portable manipulandum, such as the position and/or velocity of the tennis racket. The processor may execute an application program, e.g., a virtual tennis application program. In the application program, the player may compete, for example, with a virtual opponent.

In one scenario, the player swings the racket at a virtual tennis ball (e.g., to simulate a serve), resulting in a sensor signal being generated by the sensor and sent to the processor. The processor may use the sensor signal to compute the resulting motion of the virtual tennis ball, as well as a counter move made, for example, by the virtual opponent. The processor can also determine and output a control signal to the actuator. The control signal is configured to cause the actuator to output a haptic feedback that simulates, for example, the impact between the virtual tennis ball and the tennis racket when the player strikes the virtual tennis ball struck back by the virtual opponent. The haptic effect can also be correlated with how/where the virtual tennis ball hits the racket, so as to enhance the realism of the playing. The contest between the player and the virtual opponent may also be displayed on a display device (e.g., a television), and/or broadcast by an audio device (e.g., one or more speakers).

U.S. Pat. No. 6,366,272 provides some embodiments of systems and methods for providing interactions between simulated objects using force feedback, the entire disclosure of which is incorporated herein by reference.

Systems and methods in accordance with the invention are further described below with reference to FIGS. 2-6. The invention is not limited to the examples given; there are a variety of systems and methods to make and use the invention.

Figure 2:
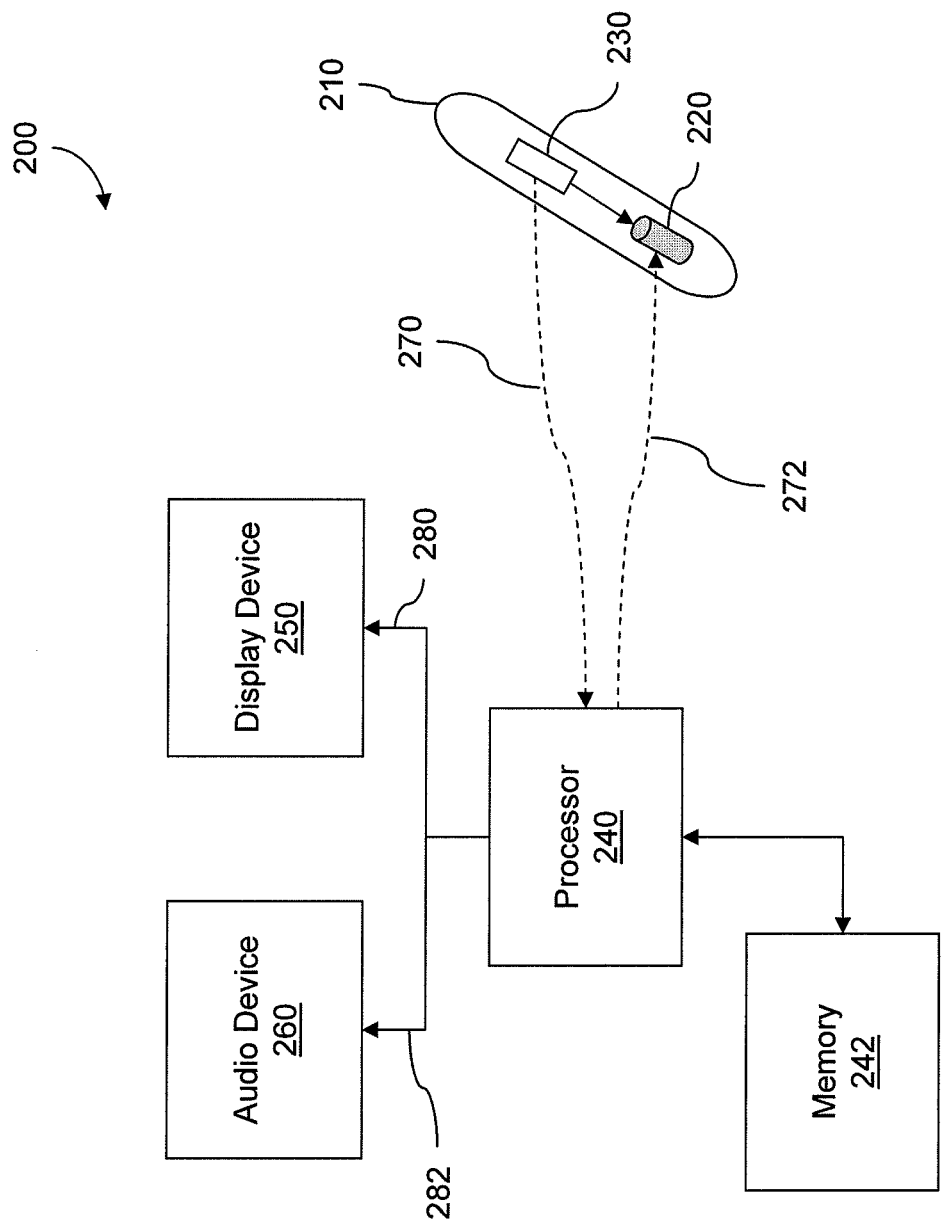
FIG. 2 shows a schematic diagram of an interactive gaming system with haptic feedback, comprising a port manipulandum with an actuator disposed therein, according to one embodiment of the present invention.

Referring now to the drawings in which like numerals indicate like elements. FIG. 2 depicts a schematic diagram of an interactive gaming apparatus 200 with haptic feedback, according to one embodiment of the invention. By way of example to illustrate some general principles of the invention, the apparatus 200 comprises a portable manipulandum 210, which is configured to simulate an element associated with a sports or physical activity. For example, in one embodiment, the manipulandum is configured to simulate a tennis racket. In other embodiments, the manipulandum can be configured to simulate various elements for other sports/physical activities, such as a baseball bat, a sword, a boxing glove, a drum stick, etc. See the description below for more examples.

An actuator 220 may be disposed in and form an integrated structure with the portable manipulandum 210. For example, a motor connected to an eccentric mass may be disposed in the handle of a simulated tennis racket to provide haptic effects to the user holding the tennis racket. The embodiment shown in FIG. 2 also comprises a sensor 230 in communication with the portable manipulandum 210. The sensor 230 provides a sensor signal associated with the movement of the portable manipulandum 210, e.g., the position and/or velocity of the portable manipulandum 210. In the embodiment of FIG. 2, the sensor 230 is shown to be disposed in and form an integrated structure with the portable manipulandum 210. For example, in one embodiment, a simulated tennis racket may comprise a motion sensor, such as an accelerometer or tilt sensor, to provide a sensor signal, for example, tracking the movement of the portable manipulandum 210 by the user or otherwise. In other embodiments, the sensor as a whole or in part may be physically separate from the portable manipulandum 210, or as further described in some of the embodiments below.

In the embodiment shown in FIG. 2, the apparatus also comprises a processor 240 in communication with the sensor 230 and the actuator 220. The processor 240 may communicate with the actuator 220 and the sensor 230 via wired and/or wireless communications means 270, 272. For example, in one embodiment, the processor 240, the sensor 230, and the actuator 220 may comprise Bluetooth or other wireless transceivers. The processor 240 receives sensor signals from the sensor 230 and generates control signals for the actuator 220, which are based, at least in part, on the sensor signals. The processor 240 may also execute an application program, such as a virtual sports activity application program.

In one embodiment, the processor 240 may be physically separated from the portable manipulandum 210, such as illustrated in FIG. 2. For example, the processor 240 may be included in a console or housing (along with associated electronics and other components, for example). In some embodiments, the processor 240 can also be included in a computer (e.g., a desktop or laptop), a television set, or other controllers, configured to execute an application program pertaining to an interactive gaming application, as described above. In other embodiments, the processor 240 may be disposed in and form an integrated structure with the portable manipulandum 210 (e.g., along with the actuator 220 and/or the sensor 230). This configuration may, for example, be implemented in a fishing or shooting game. In one embodiment of such a configuration, for example, the portable manipulandum 210 (e.g., a fishing rod or rifle) may be configured to be self-contained, e.g., comprising all the associated electronics and components necessary to play the simulation, and there need not be an external console or a computer.

The processor 240 may also be in communication with a display device 250 (e.g., a television, a computer monitor, or other suitable display device) via a wired or wireless communications means 280. The processor 240 may additionally be in communication with an audio device 260 (e.g., one or more speakers) via a wired or wireless communications means 282. Although the audio device 260 is shown separate from the display device 250, the audio device 260 and display device 250 may be combined in some embodiments of the invention.

The term "portable" is herein construed broadly to include manipulanda that can be hand-held and operated in a stand-alone or un-tethered fashion. In some embodiments, it may be desirable for the manipulandum to communicate with an external processor via a wired communication means; however, the manipulandum is otherwise stand-alone or un-tethered mechanically. The portable manipulandum is configured to take on or imitate (i.e., simulate) the appearance and/or form of an element associated with a sports or physical activity, as the embodiments of FIG. 1 illustrate. The ensuing description provides more examples of such portable manipulandum.

In the above and following embodiments, the term "disposed in" includes that the actuator 220 (or the sensor 230, or the processor 240) is configured such to form an integrated structure with the portable manipulandum 210. For example, the actuator 220 (or the sensor 230, or the processor 240) may be enclosed inside a housing of the manipulandum 210, the actuator 220 (or the sensor 230, or the processor 240) may be embedded in (or mounted on) a body (or housing) of the manipulandum 210, or the actuator 220 (or the sensor 230, or the processor 240) may be disposed in the portable manipulandum 210 via other mechanisms.

In the embodiment of FIG. 2, the processor 240 is configured to receive a sensor signal from the sensor 230 associated with the movement of the portable manipulandum 210. For example, the sensor signal may track a swing made by a user or player. The processor 240 is also configured to output a control signal to the actuator 220, which is based at least in part on the sensor signal. The control signal is configured to cause the actuator 220 to output a haptic feedback associated with the movement of the portable manipulandum 210, e.g., simulating an impact between the portable manipulandum 210 and an object (e.g., a tennis racket and a tennis ball).

In one embodiment, the portable manipulandum 210 may be used, for example, by a player (not explicitly shown) as a tennis racket to practice playing tennis. The sensor 230 can be, for example, a motion sensor such as an acceleration sensor (or tilt sensor), e.g., disposed in the portable manipulandum 210 in a manner that allows it to effectively track the motion of portable manipulandum 210. The sensor 230 may be an accelerometer (piezoelectric, MEMS (Micro-Electro-Mechanical Systems) based, etc.), a gyroscope, a receiver (infrared, radio frequency, etc.), or other sensing means capable of measuring position change, velocity, and/or acceleration of the manipulandum 210. When the player swings the racket 210, the sensor 230 generates a sensor signal indicating the motion of the tennis racket, e.g., its position, velocity, and/or acceleration (e.g., speed, direction, and rate of change in direction and/or speed).

The processor 240 may execute an application program, which may be, for example, stored in a memory 242. For example, the processor 240 may execute a virtual tennis application program, in which the player may compete, for example, with a virtual opponent. In one scenario, the player swings the racket at a virtual tennis ball (e.g., to simulate a serve), resulting in a sensor signal being generated by the sensor 230 and sent to the processor 240. The processor 240 may use the sensor signal to compute the resulting motion of the virtual tennis ball, as well as a counter move made, for example, by the virtual opponent. The processor 240 can also determine and output a control signal to the actuator 220. The control signal is configured to cause the actuator 220 to output a haptic feedback that simulates, for example, the impact between the virtual tennis ball and the tennis racket when the player strikes the virtual tennis ball struck back by the virtual opponent. For example, the processor 240 may generate a control signal configured to cause the actuator 220 to output a jolt sensation as the tennis racket "impacts" the virtual tennis ball. The haptic feedback can be correlated with how/where the virtual tennis ball hits the racket, for example, so as to enhance the realism of the playing. Various haptic effects can also be created for other events of interest, and/or to simply enhance the joy of playing. U.S. Pat. No. 6,366,272 discloses some examples of application programs designed and implemented for simulated (or virtual) interactions, the entire disclosure of which is incorporated herein by reference.

The application program may further implement a graphical environment on the display device 250, for example, a virtual playing field (e.g., a tennis court) with the virtual opponent and/or a virtual representation of the player to graphically illustrate the contest between the player and the virtual opponent. In addition, the application program may have, for example, the status of the contest broadcasted by the audio device 260, along with other audio cues that mimic the real environment (e.g., applauses from virtual audience, announcer commentary, opponent banter or "heckling," in-game sounds such as "cracking" of a bat or "clicking" of a fishing reel, etc.).

Figure 3:
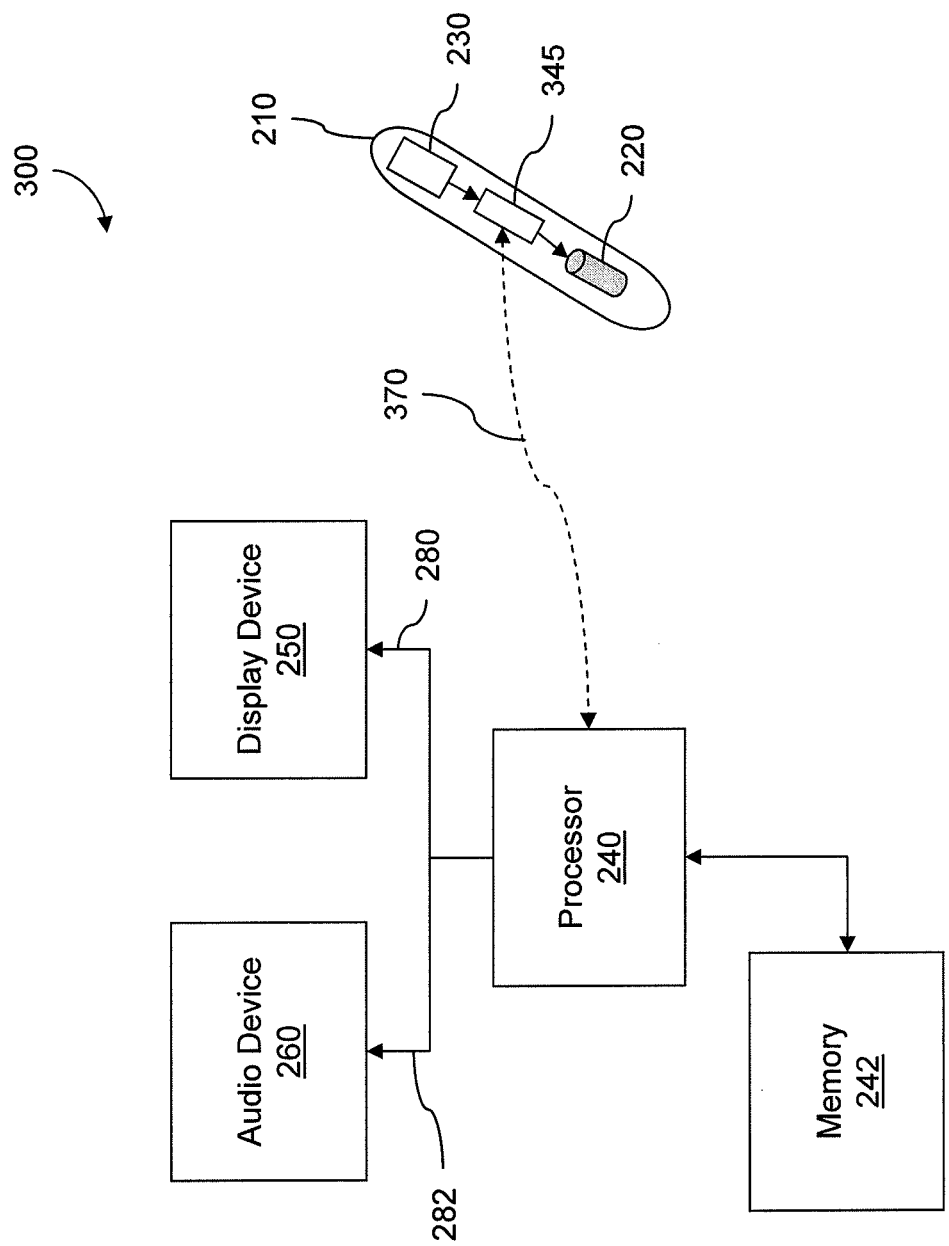
FIG. 3 shows a schematic diagram of an interactive gaming system with haptic feedback, comprising a host processor and a local processor, according to one embodiment of the present invention.

The embodiment of FIG. 2 may further include a second (or "local") processor, e.g., configured to work in conjunction with the first (or "host") processor 240 in controlling the actuator 220, so as to deliver the desired haptic effects. FIG. 3 shows a schematic diagram of an interactive gaming apparatus 300 comprising host and local processors, according to one embodiment of the invention. By way of example, the apparatus 300 of FIG. 3 may be built on the apparatus 200 of FIG. 2, and hence like elements are labeled with like numerals. In the embodiment of FIG. 3, a local processor 345 is disposed in and forms an integrated structure with the portable manipulandum 210. The local processor 345 is configured to be in communication with the host processor 240 via a wired and/or wireless communication means 370. For example, the local processor 345 and the host processor 240 may include wireless communication means, such as Bluetooth transceivers, various types of IEEE 802 transceivers, infrared communication means, or ultrasonic communication means.

In one embodiment, the host processor 240 may be configured to send high-level force commands (e.g., "generating a sweet spot" for a tennis game, or "generating a home-rum" for a baseball game) to the local processor 345. A high-level force command can be a command that provides a general description of the haptic effect but may not include the details, such as the particular frequency, amplitude, or duration, of the control signal to be generated for the actuator 220. In response, the local processor 345 can provide appropriate control signals to the actuator 220 to render the desired haptic effects. A set of pre-determined "haptic effects" can be stored, for example, in a local memory (not explicitly shown) associated with the local processor 345, such that the corresponding haptic effects can be looked up upon receiving the high-level commands from the host processor 240. For example, the memory may comprise a look-up table that includes two fields. The first field may contain the names of the high-level effects to be implemented. The second field may include a collection of data (e.g., a frequency, amplitude, and duration, etc.) necessary to generate a particular haptic effect. U.S. Pat. Nos. 5,734,373, 5,959,613, 6,028,593, 6,300,937, and 6,411,276 disclose some embodiments of haptic systems employing host and local processors and associated controlling schemes, the disclosures of all of which are incorporated herein by reference.

The local processor 345 can also be configured to generate haptic effects in an interactive or dynamic manner. By way of example in the embodiment of FIG. 3, the local processor 345 is shown to be disposed in the portable manipulandum 210 (along with the actuator 220 and the sensor 230, for example), which may be desired in some applications. In other embodiments, the local processor 345 may be physically separated from the portable manipulandum 210 (or stand-alone). By way of example, FIG. 3 also shows that the sensor 230 is in communication with the local processor 345. In other embodiments, the sensor 230 may also or instead be in communication with the host processor 240, as described above with respect to the embodiment of FIG. 2. For example, in one embodiment, the host processor 240 receives sensor signals from the sensor 230 and determines the appropriate high-level command signals to send to the local processor 345. The local processor 345 can generate control signals for use by the actuator 220, based at least in part on the high-level command signals from the host processor 240.

Figure 4:
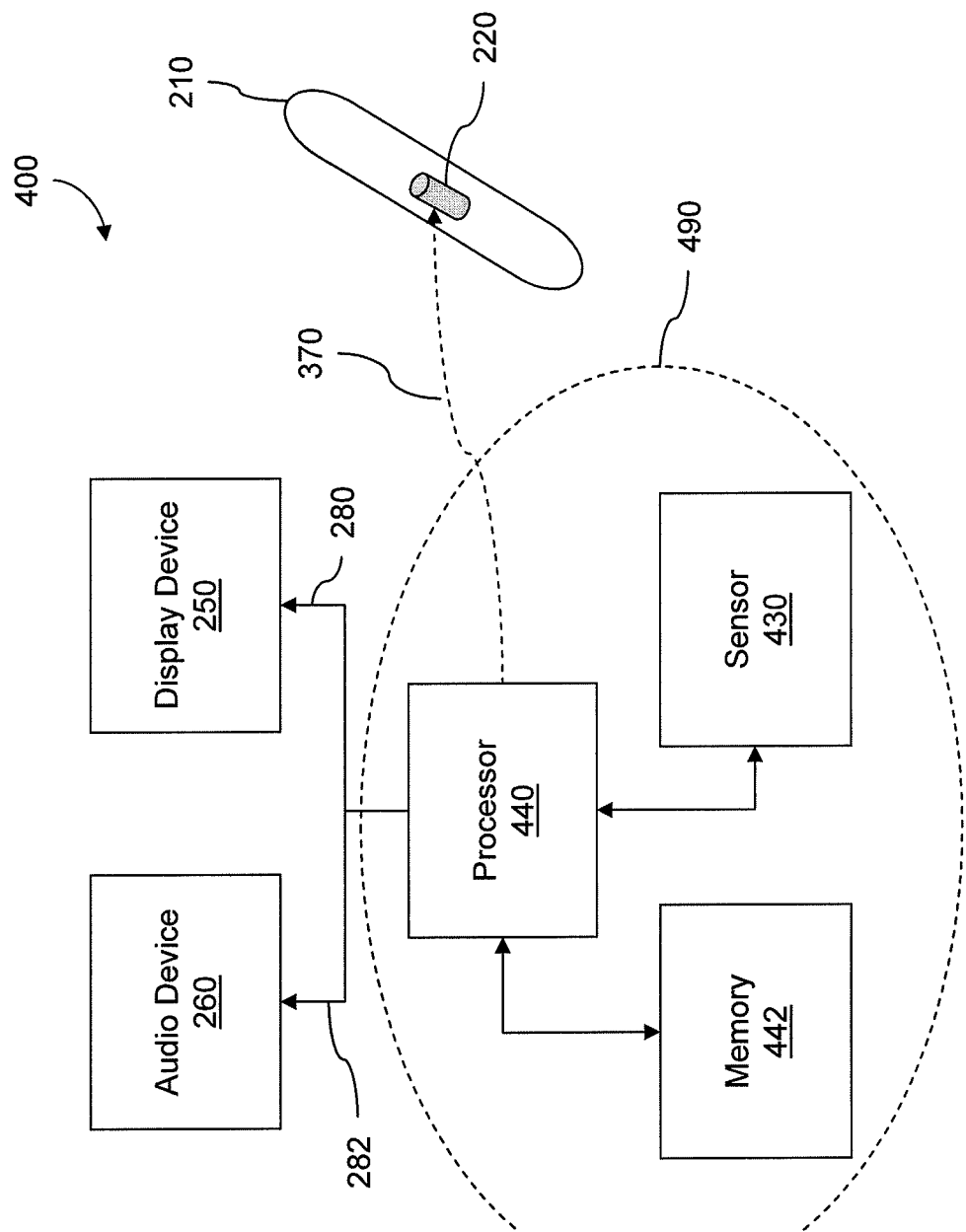
FIG. 4 shows a schematic diagram of an interactive gaming system with haptic feedback, comprising a camera as a sensor, according to one embodiment of the present invention.

FIG. 4 shows a schematic diagram of an interactive gaming apparatus 400 with haptic feedback, according to one embodiment to the invention. For purposes of illustration and simplicity, the apparatus 400 may make use of some of the elements employed in the apparatus 200 of FIG. 2, and hence like elements are labeled with like numerals. (The apparatus 400 can also be built on the apparatus 300 of FIG. 3 in alternative embodiments.) The apparatus 400 includes a sensor 430, which can be, for example, a video (or infrared) camera, configured to capture the motion of the portable manipulandum 210. In the embodiment shown, no sensor is disposed in the portable manipulandum 210. However, in other embodiments, the portable manipulandum 210 may comprise internal sensors as well. In one embodiment, the portable manipulandum 210 may be colored, or bear some color patterns on its outer surface, so as to enhance the contrast between manipulandum 210 and the ambient environment and thereby to aid the sensor 430 in accurately capturing the motion of the manipulandum 210.

The sensor signal (e.g., image data) from the sensor 430 is communicated to a processor 440. In one embodiment, the sensor 430 and the processor 440 (along with a memory 442 and/or other associated electronics) may constitute an integrated console (or housing) 490, situated at a location that allows the sensor 430 to effectively capture the range of motion of the portable manipulandum 210. For example, in one embodiment, the portable manipulandum 210 may comprise a baseball bat. A console 490 is constructed to be placed on the floor and resemble a home plate. The console 490 comprises one or more sensors configured such to allow the console to capture the motion of the simulated baseball bat across the plate. A processor 440 situated in the console 490 receives the sensor signal, and if the simulated bat strikes a simulated baseball, the processor 440 generates a control signal to the actuator 220. The actuator 220 is in communication with the processor 440 via a wired and/or wireless communication means 470. For example, in the baseball simulation system described above, the actuator 220 may comprise a Bluetooth (or other wireless) receiver. A Bluetooth (or other wireless) transmitter in the console 490 or integrated in the processor 440 may transmit the control signal to the actuator 220. In another embodiment, the processor 440 (along with the memory 442) may be included in a computer (or a television set), with the sensor 430 being, for example, a video camera peripheral to the computer. The use of a camera as a motion sensing means allows a "one-way" communication between the processor 440 and the portable manipulandum 210, which may be desired in some applications. The apparatus 400 can be substantially similar to the embodiment of FIG. 3 in operation and functionality, as described above.

Figure 5:
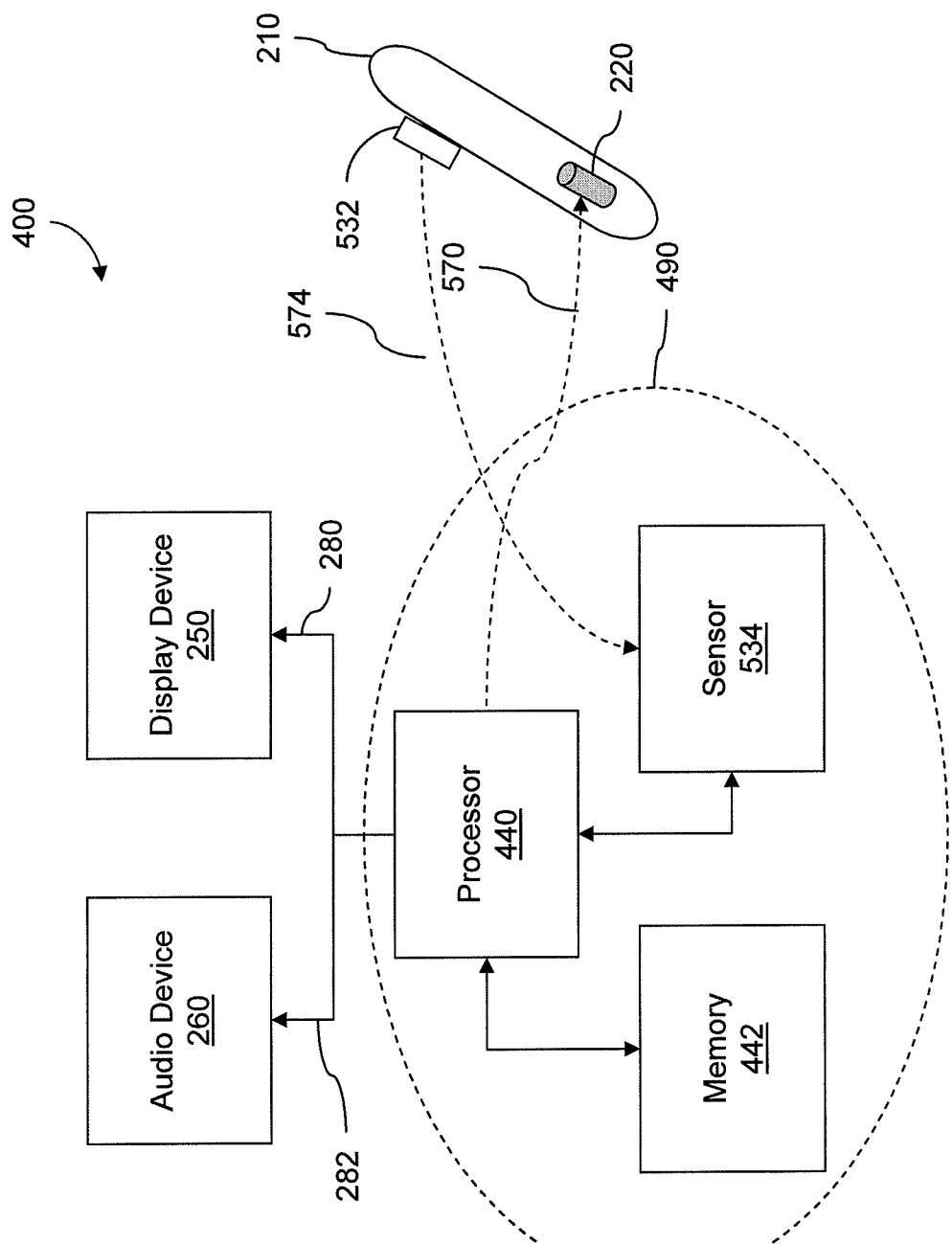

In some embodiments, a two-body (or multi-body) sensing system may also be implemented. FIG. 5 depicts a schematic diagram of an interactive gaming apparatus 500 with a two-body sensing system, according to one embodiment to the invention. For purposes of illustration and simplicity, the apparatus 500 may make use of some of the elements employed in the embodiments of FIGS. 2 and 4, and hence like elements are labeled with like numerals. (The apparatus 500 can also be built on the apparatus 300 of FIG. 3 in alternative embodiments.) In the apparatus 500, a sensor (or sensing system) including a first element 532 and a second element 534 can be implemented. In one embodiment, the first element 532 can be an emitter, e.g., configured to emit (or broadcast) an electromagnetic radiation or sound wave 574 in a particular frequency range. The second element 534 can be a detector/receiver, e.g., configured to communicate with and receive the radiation or sound wave originating from the emitter.

In one embodiment, for example, the first element 532 can be attached to (or mounted on) the portable manipulandum 210. The second element 534 can be disposed in the console 490, configured to receive sensor signals emitted (or broadcasted) from the first element 532 and communicates the sensor signals to the processor 440. In other embodiments, the second element 534 can also be physically separate from the console 490, e.g., be placed at a location that allows it to best communicate with the first element 532. In any case, the first and second elements 532, 534 are configured to work in conjunction to effectively track the movement of the portable manipulandum 210. The processor 440 in turn generates control signals based on the received sensor signals, and outputs the control signals to the actuator 220 via a wired and/or wireless communication means 570.

In another embodiment, the first element 532 can be disposed in the console 490, and the second element 534 can be attached to (or mounted on) the portable manipulandum 210, as depicted in FIG. 6. In the embodiment shown in FIG. 6, the second element 534 may additionally be in communication with the processor 440, for example, via a wired and/or wireless communication means 672.

In the embodiments above, the first element 532 can be a radio frequency (RF) emitter, an infrared emitter, an ultrasound emitter, or any other known radiation (or wave) source. The second element 534 can be a detector/receiver devised to work effectively with the first element 532. In addition to a two-body sensor, a sensing system including a plurality of emitters and/or a plurality of receivers can also be implemented in an interactive gaming system of the invention, configured such to effectively track the movement of the manipulandum 210.

In one embodiment of the invention, for example, a plurality of receivers and/or emitters can be arranged such that the movement of the manipulandum 210 can be "triangulated" from the plurality of resultant sensor signals. In another embodiment, a plurality of actuators can be, for example, arranged in a particular spatial pattern and actuated selectively in accordance with the gaming events, such as where/how the impact between the portable manipulandum (e.g., a racket) and the simulated object (e.g., a virtual ball) occurs.

An interactive gaming system of the invention (e.g., one of the embodiments described above) can also be applied to a situation where a player is playing with an opponent or a computer over a network, such as Internet. In one embodiment, the processor 240 (or 340) can, for example, be equipped with wired and/or wireless networking capabilities. For example, in one embodiment, the processor 240 (or 340) may comprise a wireless communication means (e.g., a Wi-Fi device based on IEEE 802.11, or other IEEE 802 transceivers), a Bluetooth chip, or other networking means. The processor 240 (or 340) can, for example, send to the network information related to the motion of the player, as well as receive from the network information related to a move made by the opponent, and so on. Based on such information, the processor 240 (or 340) outputs appropriate control signals to the actuator 220 for rendering the desired haptic effects, e.g., in a manner similar to that described above. The processor 240 (or 340) may further instruct the display device 250 to display the playing of the opponent (e.g., making use of the imaging data taken by the camera such as described in the embodiment of FIG. 3). The processor 240 (or 340) may alternatively cause a virtual playing field along with a "virtual representation" of the opponent to be displayed. Audio cues can also be generated, e.g., in a manner similar to that described above.

In the above, the actuator 220 can be an eccentric mass actuator (e.g., a pager motor), a harmonic eccentric mass actuator, an inertial mass harmonic actuator, a voice coil, a moving magnet actuator, a piezoelectric actuator, an electroactive polymer actuator, or any other suitable actuation means known in the art. The actuator 220 can be, for example, disposed in the housing of the portable manipulandum 210, e.g., via a suitable mechanism that is effective in transmitting haptic effects. In some applications such as fishing, a resistive actuator (e.g., an electromagnetic brake) can also be utilized, e.g., coupled to the crank mechanism of the fishing pole. In other embodiments, it might be desired to implement a plurality of actuators in the portable manipulandum, such as described above, so as to output haptic effects that mimic the underlying application. Haptic effects can be kinesthetic, tactile, or other types of feedback forces deemed appropriate. U.S. Pat. Nos. 5,734,373, 6,285,351, and 6,300,936 provide more details on configuring and implementing haptic feedback systems, the disclosures of all of which are incorporated herein by reference.

As described above, the portable manipulandum 210 is configured to simulate an element associated with a sports or physical activity, such as a racket for playing tennis, badminton, racquet ball, squash, ping-pong, and the like, or a bat (or club) for playing baseball, hockey, golf, and the like. The actuator 220 can be configured and controlled accordingly to deliver haptic effects desired for a given application.

Furthermore, the portable manipulandum 210 can be configured to simulate a fishing rod, where the haptic feedback can, for example, be related to the sensation of catching and/or maneuvering a fish. The portable manipulandum 210 can also be configured to simulate a gun or rifle, where the haptic feedback may mimic, for example, the sensation of "recoiling" during shooting. Such can be used, for example, in hunting or shooting practices (e.g., for training military personnel). For example, in one embodiment, a simulated rifle may comprise one or more pager motors (or other eccentric mass actuators), configured such that vibrations (or a jolt) are output during shooting to mimic the recoiling sensation.

In addition, the portable manipulandum 210 can be configured to simulate a sword for fencing, martial arts, or the like, where the haptic feedback can, for example, be correlated with the sword coming into contact with that (or a body part) of the opponent. For example, in one embodiment, a simulated sword can comprise one or more motors, configured such that a jolt or impulse like force is output when the sword hits a virtual one.

The portable manipulandum 210 may alternatively be configured to simulate a glove for boxing or baseball, or a football, where the haptic feedback can, for example, be associated with the sensation of receiving a punch from an opponent, or catching a ball. Moreover, there can be applications where the portable manipulandum 210 is configured such to be attachable to a body part, such as a leg of a soccer player, thereby enabling the player to experience the physical sensations associated with kicking a soccer ball, for instance. For example, in one embodiment, a plurality of actuators (e.g., piezoelectric buzzers) may be disposed in a simulated boxing glove at different locations, so as to output haptic effects in relation to where/how virtual punches are received.

The portable manipulandum 210 may also be configured to simulate a drumstick for beating a drum, or other stick (or rod) like elements for striking/plucking a music instrument, where the haptic feedback can, for example, be associated with the stick striking the surface of a virtual drum (or corresponding part of other music instrument). For example, in one embodiment, a simulated drumstick can comprise one or more actuators (e.g., piezoelectric or voice coil buzzers), configured such that a jolt or impulse like force is output when the drumstick strikes the virtual drum. In another embodiment, a console comprising a ring-like structure may be, for example, implemented to resemble (or simulated) a drum, where a plurality of sensors (e.g., infrared, optical, or RF sensors) may be positioned on the perimeter of the ring-like structure. When the simulated drumstick strikes a virtual surface of the simulated drum (e.g., an imaginary surface as provided by the ring-like structure), one or more sensor signals are output and sent to a processor (e.g., situated in the console). Based on these and other sensor signals (e.g., the simulated drumstick may also comprise one or more internal sensors), the processor can determine, for example, the location and/or speed at which the simulated drumstick strikes the virtual drum surface, and generate one or more control signals accordingly to one or more actuators disposed in the simulated drumstick. A haptic feedback is then output, which may, for example, be correlated with the manner by which the drumstick strikes the simulated drum. Alternative embodiments may, for example, comprise other sensing means, such as those described above with respect to the embodiments of FIGS. 2-6.

In other embodiments, the invention can be used to simulate other sports/physical activities those skilled in the art contemplate. All in all, haptic feedback can be used to enhance the realism of such gaming, to complement various events of interest, and/or to create more fun to the player.

In the above, processors (e.g., the processors 240, 345, 440) can generally include, for example, digital logical processors/controllers capable of processing input, execute algorithms, and generate output, as necessary to cause the desired haptic effects to be output to the portable manipulandum 210. Suitable processors include, for example, a microprocessor, an Application Specific Integrated Circuit (ASIC), state machines, an analog or digital circuit, or a combination of multiple circuits, and the like. Such processors can include a variety of other components, such as, for example, co-processors, graphics processors, etc. Such processors may also include, or may be in communication with, media, such as computer (or processor) readable media (e.g., the memories 242, 442 above), which store instructions that, when executed by the processor, cause the processor to perform certain functions/steps (e.g., those described above with respect to the application program).

One embodiment of a computer (or processor) readable medium includes an electronic, optical, magnetic, or other storage or transmission device capable of providing a processor with computer-readable instructions. Other examples of computer readable media include, but are not limited to, random access memory (RAM), read-only memory (ROM), electronically programmable read only memory (EPROM), erasable electronically programmable read only memory (EEPROM), flash memory, hard drives, DVD drives, CD-R/RW drive, floppy diskettes, all optical media, photomagneto-electric disks, magnetic tapes or other magnetic media, or any other medium from which a processor can read.

The display device 250 in the above can include (but is not limited to) a computer or television monitor (e.g., CRT, LCD, flat panel, etc.), a 3-D goggle, or any other display means known in the art. The audio device 260 can include, for example, one or more speakers, or any other known audio/sound generating means.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed is:

1. An apparatus, comprising:
   a portable manipulandum configured to simulate an element associated with a physical activity;
   an actuator disposed in the portable manipulandum, wherein the actuator comprises one of a pager motor, an eccentric mass actuator, a harmonic eccentric mass actuator, an inertial mass harmonic actuator, a voice coil, a moving magnet actuator, a piezoelectric actuator, or an electro-active polymer actuator;

a sensor in communication with the portable manipulandum and configured to detect a movement of the portable manipulandum; and a processor in communication with the sensor and the actuator, the processor configured to receive a sensor signal from the sensor associated with the movement of the portable manipulandum and to output a control signal to the actuator based at least in part on the sensor signal and haptic data in a lookup table, wherein the lookup table comprises a first data field and a second data field, wherein the first data field comprises a name of a haptic effect and the second data field comprises a portion of the haptic data, and wherein the control signal is configured to cause the actuator to output a haptic feedback associated with the movement of the portable manipulandum, the haptic feedback comprising a vibrotactile effect.

2. The apparatus of claim 1 wherein the haptic feedback is operable to simulate an impact between the portable manipulandum and an object.

3. The apparatus of claim 1 wherein the sensor is disposed in the manipulandum.

4. The apparatus of claim 3 wherein the sensor comprises one of an acceleration sensor or a tilt sensor.

5. The apparatus of claim 1 wherein the processor is disposed in the portable manipulandum.

6. The apparatus of claim 1 wherein the processor is disposed in a housing separate from the portable manipulandum.

7. The apparatus of claim 6 wherein the processor comprises a wireless communication means for communicating with at least one of the sensor or the actuator.

8. The apparatus of claim 6 wherein the processor is a first processor, the apparatus further comprising a second processor in communication with the first processor, the second processor being disposed in the manipulandum.

9. The apparatus of claim 1 wherein the sensor comprises a first element and a second element in communication with one another.

10. The apparatus of claim 9 wherein the first element is disposed in the portable manipulandum, the second element and the processor being included in a housing separate from the portable manipulandum.

11. The apparatus of claim 9 wherein the second element is disposed in the portable manipulandum, the first element and the processor being included in a housing separate from the portable manipulandum.

12. The apparatus of claim 9 wherein the first element includes one of a radio frequency emitter, an infrared emitter, or an ultrasound emitter.

13. The apparatus of claim 12 wherein the second element comprises one of a radio frequency receiver, an infrared receiver, or an ultrasound receiver.

14. The apparatus of claim 1 wherein the sensor comprises one of a video camera or an infrared camera.

15. The apparatus of claim 14 wherein the sensor and the processor are disposed in a housing separate from the portable manipulandum.

16. The apparatus of claim 1 wherein the processor is further configured to execute an application program associated with the physical activity.

17. The apparatus of claim 16 further comprising a memory in communication with the processor, the memory storing the application program.

18. The apparatus of claim 16 wherein the application program causes a graphical environment associated with the physical activity to be output.

19. The apparatus of claim 18 wherein the output comprises a visual display on a display device.

20. The apparatus of claim 18 wherein the output comprises an audio output from an audio device, the audio output indicating a status associated with the physical activity.

21. The apparatus of claim 1 wherein the element associated with the physical activity comprises one of a tennis racket, a badminton racket, a racquetball racket, a squash racket, a ping-pong racket, a baseball bat, a hockey stick, a golf club, a gun, a rifle, a sword, a boxing glove, a baseball glove, a football, or a drumstick.

22. An apparatus, comprising:
a portable manipulandum configured to simulate an element associated with a physical activity;
a sensor in communication with the portable manipulandum and configured to output a sensor signal associated with a movement of the portable manipulandum; and
an actuator disposed in the portable manipulandum, the actuator configured to receive a control signal based at least in part on the sensor signal and haptic data in a lookup table, wherein the lookup table comprises a first data field and a second data field, wherein the first data field comprises a name of a haptic effect and the second data field comprises a portion of the haptic data, and to output a haptic feedback that simulates an impact between the portable manipulandum and an object, the haptic feedback comprising a vibrotactile effect, and wherein the actuator comprises one of a pager motor, an eccentric mass actuator, a harmonic eccentric mass actuator, an inertial mass harmonic actuator, a voice coil, a moving magnet actuator, a piezoelectric actuator, or an electro-active polymer actuator.

23. The apparatus of claim 22 wherein the sensor is disposed in the portable manipulandum.

24. The apparatus of claim 22 wherein the sensor includes one of a video camera or an infrared camera, separate from the manipulandum.

25. The apparatus of claim 22 further comprising a processor in communication with the sensor and the actuator, the processor configured to receive the sensor signal from the sensor and to output the control signal to the actuator.

26. The apparatus of claim 25 wherein the processor is disposed in the portable manipulandum.

27. The apparatus of claim 25 wherein the processor is separate from the portable manipulandum.

28. The apparatus of claim 27 wherein the processor is included in one of a computer or a television set.

29. The apparatus of claim 23 further comprising a memory in communication with the processor, the memory storing an application program associated with the physical activity.

30. The apparatus of claim 29 wherein the application program is configured to cause a graphical environment associated with the physical activity to be output.

31. The apparatus of claim 30 wherein the output comprises a visual display on a display device.

32. The apparatus of claim 30 wherein the output comprises an audio output from an audio device, the audio output indicating a status associated with the physical activity.

33. The apparatus of claim 22 wherein the element associated with the physical activity includes one of a tennis racket, a badminton racket, a racquetball racket, a squash racket, a ping-pong racket, a baseball bat, a hockey stick, a golf club, a gun, a rifle, a sword, a boxing glove, a baseball glove, a football, or a drumstick.

34. A method, comprising:
providing a portable manipulandum, the portable manipulandum configured to simulate an element associated with a physical activity;
providing a sensor in communication with the portable manipulandum, the sensor configured to output a sensor signal associated with a movement of the portable manipulandum; and
providing an actuator disposed in the portable manipulandum, the actuator configured to receive a control signal based at least in part on the sensor signal and haptic data in a lookup table, wherein the lookup table comprises a first data field and a second data field, wherein the first data field comprising a name of a haptic effect and the second data field comprises a portion of the haptic data, and to output a haptic feedback associated with the movement of the portable manipulandum, the haptic feedback comprising a vibrotactile effect, and wherein the actuator comprises one of a pager motor, an eccentric mass actuator, a harmonic eccentric mass actuator, an inertial mass harmonic actuator, a voice coil, a moving magnet actuator, a piezoelectric actuator, or an electroactive polymer actuator.

35. The method of claim 34 wherein the haptic feedback is operable to simulate an impact between the portable manipulandum and an object.

36. The method of claim 34 further comprising providing a processor in communication with the sensor and the actuator, the processor configured to receive the sensor signal from the sensor and to output the control signal to the actuator.

37. The method of claim 36 wherein the processor is disposed in the portable manipulandum.

38. The method of claim 36 wherein the processor is separate from the portable manipulandum.

39. The method of claim 38 wherein the sensor includes one of a video camera or an infrared camera, the sensor and the processor being disposed in a housing separate from the portable manipulandum.

40. The method of claim 36 wherein the processor is a first processor, the method further comprising providing a second processor in communication with the first processor, the second processor being disposed in the portable manipulandum.

41. The method of claim 34 wherein the sensor includes a first element and a second element in communication with one another.

42. The method of claim 41 wherein the first element is disposed in the portable manipulandum, the second element and the processor being included in a housing separate from the portable manipulandum.

43. The method of claim 41 wherein the second element is disposed in the portable manipulandum, the first element and the processor being included in a housing separate from the portable manipulandum.

44. The method of claim 41 wherein the first element includes one of a radio frequency emitter, an infrared emitter, or an ultrasound emitter.

45. The method of claim 44 wherein the second element includes one of a radio frequency receiver, an infrared receiver, or an ultrasound receiver.

46. The method of claim 34 wherein the element associated with the sports activity includes one of a tennis racket, a badminton racket, a racquet ball racket, a squash racket, a ping-pong racket, a baseball bat, a hockey stick, a golf club, a gun, a rifle, a sword, a boxing glove, a baseball glove, a football, or a drumstick.

47. The apparatus of claim 1, wherein the portion of the haptic data is predetermined.

48. The apparatus of claim 22, wherein the portion of the haptic data is predetermined.

49. The method of claim 34, wherein the portion of the haptic data is predetermined.

* * * * *

UNITED STATES PATENT AND TRADEMARK OFFICE
CERTIFICATE OF CORRECTION

PATENT NO.       : 8,992,322 B2
APPLICATION NO.  : 10/864108
DATED            : March 31, 2015
INVENTOR(S)      : Shoichi Endo et al It is certified that error appears in the above-identified patent and that said Letters Patent is hereby corrected as shown below:

Title page
a. Item (56) Under "US Patent Documents", Please insert the following references:

| | | |
|---|---|---|
| -- 3,911,416 | 10/1975 | Feder -- |
| -- 3,944,798 | 03/1976 | Eaton -- |
| -- 3,919,691 | 11/1975 | Noll -- |
| -- 3,890,958 | 06/1975 | Fister et al. -- |
| -- 3,875,488 | 04/1975 | Crocker et al. -- |
| -- 3,531,868 | 10/1970 | Stevenson -- |
| -- 2,906,179 | 09/1959 | Bower -- |
| -- 4,800,721 | 01/1989 | Cemenska et al. -- |
| -- 4,798,919 | 01/1989 | Miessler et al. -- |
| -- 4,791,934 | 12/1988 | Brunnett -- |
| -- 4,787,051 | 11/1988 | Olson -- |
| -- 4,782,327 | 11/1988 | Kley et al. -- |
| -- 4,769,763 | 09/1988 | Trieb et al. -- |
| -- 4,750,487 | 06/1988 | Zanetti -- |
| -- 4,704,909 | 11/1987 | Grahn et al. -- |
| -- 4,703,443 | 10/1987 | Moriyasu -- |
| -- 4,692,756 | 09/1987 | Clark -- |
| -- 4,689,449 | 08/1987 | Rosen -- |
| -- 4,688,983 | 08/1987 | Lindborn -- |
| -- 4,679,331 | 07/1987 | Koontz -- |
| -- 4,676,002 | 06/1987 | Slocum -- |
| -- 4,654,648 | 03/1987 | Herrington et al. -- |
| -- 4,653,011 | 03/1987 | Iwano -- |
| -- 4,638,798 | 01/1987 | Sheldon et al. -- |
| -- 4,632,341 | 12/1986 | Repperger et al. -- |
| -- 4,601,206 | 07/1986 | Watson -- |

Signed and Sealed this
Twenty-fourth Day of November, 2015

Michelle K. Lee
*Director of the United States Patent and Trademark Office*

| | | | |
|---|---|---|---|
| -- 4,593,470 | 06/1986 | Davies | -- |
| -- 4,571,834 | 02/1986 | Fraser et al. | -- |
| -- 4,550,617 | 11/1985 | Fraignier et al. | -- |
| -- 4,550,221 | 10/1985 | Mabusth | -- |
| -- 4,477,973 | 10/1984 | Davies | -- |
| -- 4,477,043 | 10/1984 | Repperger | -- |
| -- 4,448,083 | 05/1984 | Hayashi | -- |
| -- 4,436,188 | 08/1984 | Jones | -- |
| -- 4,398,889 | 08/1983 | Lam et al. | -- |
| -- 4,216,467 | 08/1980 | Colston | -- |
| -- 4,114,882 | 09/1978 | Mau | -- |
| -- 5,126,948 | 06/1992 | Mitchell et al. | -- |
| -- 5,107,262 | 04/1992 | Cadoz et al. | -- |
| -- 5,107,080 | 04/1992 | Rosen | -- |
| -- 5,103,404 | 04/1992 | McIntosh | -- |
| -- 5,088,055 | 02/1992 | Oyama | -- |
| -- 5,088,046 | 02/1992 | McMurtry et al. | -- |
| -- 5,080,377 | 01/1992 | Stamper et al. | -- |
| -- 5,072,361 | 12/1991 | Davis et al. | -- |
| -- 5,050,608 | 09/1991 | Watanabe et al. | -- |
| -- 5,044,956 | 09/1991 | Behensky et al. | -- |
| -- 5,040,306 | 08/1991 | McMurtry et al. | -- |
| -- 5,007,300 | 04/1991 | Siva | -- |
| -- 5,007,085 | 04/1991 | Greanias et al. | -- |
| -- 4,983,786 | 01/1991 | Stevens et al. | -- |
| -- 4,982,618 | 01/1991 | Culver | -- |
| -- 4,962,591 | 10/1990 | Zeller | -- |
| -- 4,961,267 | 10/1990 | Herzog | -- |
| -- 4,961,138 | 10/1990 | Gorniak | -- |
| -- 4,945,501 | 07/1990 | Bell et al. | -- |
| -- 4,945,305 | 07/1990 | Blood | -- |
| -- 4,942,545 | 07/1990 | Sapia | -- |
| -- 4,907,973 | 03/1990 | Hon | -- |
| -- 4,907,970 | 03/1990 | Meenen, Jr. | -- |
| -- 4,888,877 | 12/1989 | Enderle et al. | -- |
| -- 4,879,556 | 11/1989 | Duimel | -- |
| -- 4,868,549 | 09/1989 | Affinito et al. | -- |
| -- 4,849,692 | 07/1989 | Blood | -- |
| -- 4,839,838 | 06/1989 | LaBiche et al. | -- |
| -- 4,823,634 | 04/1989 | Culver | -- |
| -- 5,286,203 | 02/1994 | Fuller et al. | -- |
| -- 5,275,565 | 01/1994 | Moncrief | -- |
| -- 5,264,768 | 11/1993 | Gregory et al. | -- |
| -- 5,262,777 | 11/1993 | Low et al. | -- |
| -- 5,259,894 | 11/1993 | Sampson | -- |

CERTIFICATE OF CORRECTION (continued)
U.S. Pat. No. 8,992,322 B2

| | | |
|---|---|---|
| -- 5,259,120 | 11/1993 | Chapman et al. -- |
| -- 5,251,156 | 10/1993 | Heier et al. -- |
| -- 5,251,127 | 10/1993 | Raab -- |
| -- 5,243,266 | 09/1993 | Kasagami et al. -- |
| -- 5,228,356 | 07/1993 | Chuang -- |
| -- 5,223,776 | 06/1993 | Radke et al. -- |
| -- 5,220,260 | 06/1993 | Schuler -- |
| -- 5,204,824 | 04/1993 | Fujimaki -- |
| -- 5,193,963 | 03/1993 | McAffee et al. -- |
| -- 5,189,806 | 03/1993 | McMurtry et al. -- |
| -- 5,187,874 | 02/1993 | Takahashi et al. -- |
| -- 5,185,561 | 02/1993 | Good et al. -- |
| -- 5,184,319 | 02/1993 | Kramer -- |
| -- 5,184,306 | 02/1993 | Erdman et al. -- |
| -- 5,181,181 | 01/1993 | Glynn -- |
| -- 5,178,012 | 01/1993 | Culp -- |
| -- 5,146,566 | 09/1992 | Hollis, Jr. et al. -- |
| -- 5,143,505 | 09/1992 | Burdea et al. -- |
| -- 5,142,931 | 09/1992 | Menahem -- |
| -- 5,142,506 | 08/1992 | Edwards -- |
| -- 5,132,672 | 07/1992 | Clark -- |
| -- 5,131,844 | 07/1992 | Marinaccio et al. -- |
| -- 5,128,671 | 07/1992 | Thomas, Jr. -- |
| -- 5,526,480 | 06/1996 | Gibson -- |
| -- 5,513,100 | 04/1996 | Parker et al. -- |
| -- 5,482,051 | 01/1996 | Reddy et al. -- |
| -- 5,473,235 | 12/1995 | Lance et al. -- |
| -- 5,471,571 | 11/1995 | Smith et al. -- |
| -- 5,451,924 | 09/1995 | Massimino et al. -- |
| -- 5,445,166 | 08/1995 | Taylor -- |
| -- 5,436,638 | 07/1995 | Bolas et al. -- |
| -- 5,436,542 | 07/1995 | Petelin et al. -- |
| -- 5,435,554 | 07/1995 | Lipson -- |
| -- 5,429,140 | 07/1995 | Burdea et al. -- |
| -- 5,414,337 | 05/1995 | Schuler -- |
| -- 5,412,880 | 05/1995 | Raab -- |
| -- 5,399,091 | 03/1995 | Mitsumoto -- |
| -- 5,386,507 | 01/1995 | Teig et al. -- |
| -- 5,355,148 | 10/1994 | Anderson -- |
| -- 5,354,162 | 10/1994 | Burdea et al. -- |
| -- 5,298,890 | 03/1994 | Kanamaru et al. -- |
| -- 5,296,871 | 03/1994 | Paley -- |
| -- 5,736,978 | 04/1998 | Hasser et al. -- |
| -- 5,731,804 | 03/1998 | Rosenberg -- |
| -- 5,721,566 | 02/1998 | Rosenberg et al. -- |

| | | |
|---|---|---|
| -- 5,714,978 | 02/1998 | Yamanaka et al. -- |
| -- 5,709,219 | 01/1998 | Chen et al. -- |
| -- 5,694,013 | 12/1997 | Stewart et al. -- |
| -- 5,666,473 | 09/1997 | Wallace -- |
| -- 5,643,087 | 07/1997 | Marcus et al. -- |
| -- 5,642,469 | 06/1997 | Hannaford et al. -- |
| -- 5,631,861 | 05/1997 | Kramer -- |
| -- 5,629,594 | 05/1997 | Jacobus et al. -- |
| -- 5,625,576 | 04/1997 | Massie et al. -- |
| -- 5,619,180 | 04/1997 | Massimino et al. -- |
| -- 5,596,347 | 01/1997 | Robertson et al. -- |
| -- 5,589,854 | 12/1996 | Tsai -- |
| -- 5,587,937 | 12/1996 | Massie et al. -- |
| -- 5,586,257 | 12/1996 | Perlman -- |
| -- 5,583,478 | 12/1996 | Renzi -- |
| -- 5,577,981 | 11/1996 | Jarvik -- |
| -- 5,572,639 | 11/1996 | Grant -- |
| -- 5,565,888 | 10/1996 | Selker -- |
| -- 5,565,887 | 10/1996 | McCambridge et al. -- |
| -- 5,551,701 | 09/1996 | Bouton et al. -- |
| -- 6,104,158 | 08/2000 | Jacobus et al. -- |
| -- 6,088,019 | 07/2000 | Rosenberg -- |
| -- 6,088,017 | 07/2000 | Trembley et al. -- |
| -- 6,078,308 | 06/2000 | Rosenberg et al. -- |
| -- 6,061,004 | 05/2000 | Rosenberg -- |
| -- 6,057,828 | 05/2000 | Rosenberg et al. -- |
| -- 6,020,876 | 02/2000 | Rosenberg et al. -- |
| -- 5,990,869 | 11/1999 | Kubica et al. -- |
| -- 5,956,484 | 09/1999 | Rosenberg et al. -- |
| -- 5,844,392 | 12/1998 | Peurach et al. -- |
| -- 5,831,408 | 11/1998 | Jacobus et al. -- |
| -- 5,825,308 | 10/1998 | Rosenberg -- |
| -- 5,818,423 | 10/1998 | Pugliese et al. -- |
| -- 5,808,601 | 09/1998 | Leah et al. -- |
| -- 5,805,601 | 09/1998 | Leah et al. -- |
| -- 5,805,165 | 09/1998 | Thorne, III et al. -- |
| -- 5,802,353 | 09/1998 | Avila et al. -- |
| -- 5,790,108 | 08/1998 | Salcudean et al. -- |
| -- 5,786,818 | 07/1998 | Brewer et al. -- |
| -- 5,784,052 | 07/1998 | Keyson -- |
| -- 5,781,172 | 07/1998 | Engel et al. -- |
| -- 5,769,640 | 06/1998 | Jacobus et al. -- |
| -- 5,767,839 | 06/1998 | Rosenberg -- |
| -- 5,760,764 | 06/1998 | Martinelli -- |
| -- 5,757,358 | 05/1998 | Osga -- |

| | | |
|---|---|---|
| -- 5,755,577 | 05/1998 | Gillio -- |
| -- 5,754,023 | 05/1998 | Roston et al. -- |
| -- 5,745,715 | 04/1998 | Pickover et al. -- |
| -- 6,160,489 | 12/2000 | Perry et al. -- |
| -- 5,690,582 | 11/1997 | Ulrich et al. -- |
| -- 5,575,761 | 11/1996 | Hajianpour -- |
| -- 5,437,607 | 08/1995 | Taylor -- |
| -- 5,436,622 | 07/1995 | Gutman et al. -- |
| -- 5,283,970 | 02/1994 | Aigner -- |
| -- 5,175,459 | 12/1992 | Danial et al. -- |
| -- 5,165,897 | 11/1992 | Johnson -- |
| -- 5,022,384 | 06/1991 | Freels -- |
| -- 4,885,565 | 12/1989 | Embach -- |
| -- 4,484,191 | 11/1984 | Vavra -- |
| -- 4,464,117 | 08/1984 | Foerst -- |
| -- 4,333,070 | 06/1982 | Barnes -- |
| -- 4,262,549 | 04/1981 | Schwellenbach -- |
| -- 4,127,752 | 11/1978 | Lowthorp -- |
| -- 2,972,140 | 02/1961 | Hirsch -- |
| -- 3,659,284 | 04/1972 | Rusch -- |
| -- 4,490,810 | 12/1984 | Hon -- |
| -- 5,197,003 | 03/1993 | Moncrief et al. -- |
| -- 5,203,563 | 04/1993 | Loper, III -- |
| -- 5,583,407 | 12/1996 | Yamaguchi -- |
| -- 5,730,655 | 03/1998 | Meridith -- |
| -- 5,896,125 | 04/1999 | Niedzweicki -- |
| -- 5,897,437 | 04/1999 | Nishiumi et al. -- |
| -- 2001/0002126 | 05/2001 | Rosenberg et al. -- |
| -- 5,471,571 | 11/1995 | Smith et al. -- |
| -- 5,625,575 | 04/1997 | Goyal et al. -- |
| -- 5,629,594 | 05/1997 | Jacobus et al. -- |
| -- 5,696,532 | 12/1997 | Caprara -- |
| -- 5,696,535 | 12/1997 | Rutledge et al. -- |
| -- 5,709,219 | 01/1998 | Chen et al. -- |
| -- 5,731,804 | 03/1998 | Rosenberg -- |
| -- 5,757,358 | 05/1998 | Osga -- |
| -- 5,767,839 | 06/1998 | Rosenberg -- |
| -- 5,802,353 | 09/1998 | Avila et al. -- |
| -- 5,808,601 | 09/1998 | Leah et al. -- |
| -- 5,816,823 | 10/1998 | Naimark et al. -- |
| -- 5,844,392 | 12/1998 | Peurach et al. -- |
| -- 5,956,484 | 09/1999 | Rosenberg et al. -- |
| -- 5,977,977 | 11/1999 | Kajiya et al. -- |
| -- 5,990,860 | 11/1999 | Takeuchi -- |
| -- 6,046,726 | 04/2000 | Keyson -- |

CERTIFICATE OF CORRECTION (continued)
U.S. Pat. No. 8,992,322 B2

-- 6,131,097    10/2000    Peurach et al. --
-- 6,219,032    04/2001    Rosenberg et al. --
-- 6,326,964    12/2001    Snyder et al. -- b. Item (56) Under "Foreign Patent Documents", Please insert the following reference:

-- WO 95/33459    11/1995 --